US012120123B2

(12) United States Patent
Leach et al.

(10) Patent No.: US 12,120,123 B2
(45) Date of Patent: *Oct. 15, 2024

(54) GENERATING AND UTILIZING DIGITAL VISUAL CODES TO GRANT PRIVILEGES VIA A NETWORKING SYSTEM

(71) Applicant: Meta Platforms, Inc., Menlo Park, CA (US)

(72) Inventors: Christopher Anthony Leach, San Carlos, CA (US); Eugenio Padilla Garza, San Francisco, CA (US); Anthony Tran, Highland Park, NJ (US); Russell William Andrews, San Francisco, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/455,370

(22) Filed: Aug. 24, 2023

(65) Prior Publication Data

US 2023/0412609 A1  Dec. 21, 2023

Related U.S. Application Data

(63) Continuation of application No. 17/654,556, filed on Mar. 11, 2022, now Pat. No. 11,777,946, which is a
(Continued)

(51) Int. Cl.
*H04L 9/40* (2022.01)
*G06Q 10/1093* (2023.01)
(Continued)

(52) U.S. Cl.
CPC ....... *H04L 63/102* (2013.01); *G06Q 10/1095* (2013.01); *G06Q 20/322* (2013.01);
(Continued)

(58) Field of Classification Search
CPC ............... H04L 63/102; H04L 63/0853; H04L 63/0861; H04W 12/77; H04W 12/084;
(Continued)

(56) References Cited

U.S. PATENT DOCUMENTS

| 8,194,914 B1 | 6/2012 | Skogg et al. |
| D717,335 S | 11/2014 | Sakuma |

(Continued)

FOREIGN PATENT DOCUMENTS

| WO | 9007162 A1 | 6/1990 |
| WO | 2015044794 A1 | 4/2015 |

OTHER PUBLICATIONS

Ex Parte Quayle Action mailed Jul. 26, 2018 for U.S. Appl. No. 29/574,394, filed Aug. 15, 2016, 9 pages.
(Continued)

*Primary Examiner* — Yonas A Bayou
(74) *Attorney, Agent, or Firm* — Mannava & Kang, P.C.

(57) ABSTRACT

One or more embodiments of the disclosure include systems and methods that generate and utilize digital visual codes. In particular, in one or more embodiments, the disclosed systems and methods generate digital visual codes comprising a plurality of digital visual code points arranged in concentric circles, a plurality of anchor points, and an orientation anchor surrounding a digital media item. In addition, the disclosed systems and methods embed information in the digital visual code points regarding an account of a first user of a networking system. In one or more embodiments, the disclosed systems and methods display the digital visual codes via a computing device of the first user, scan the digital visual codes via a second computing device, and provide privileges to the second computing device in relation to the account of the first user in the networking system based on the scanned digital visual code.

20 Claims, 16 Drawing Sheets

Related U.S. Application Data continuation of application No. 16/841,445, filed on Apr. 6, 2020, now Pat. No. 11,310,240, which is a continuation of application No. 16/264,800, filed on Feb. 1, 2019, now Pat. No. 10,652,251, which is a continuation of application No. 15/237,071, filed on Aug. 15, 2016, now Pat. No. 10,237,277.

(51) Int. Cl.
  *G06Q 20/32* (2012.01)
  *G06Q 50/00* (2024.01)
  *H04W 12/084* (2021.01)
  *H04W 12/77* (2021.01)

(52) U.S. Cl.
  CPC ..... *G06Q 20/3274* (2013.01); *G06Q 20/3276* (2013.01); *G06Q 50/01* (2013.01); *H04L 63/0853* (2013.01); *H04L 63/0861* (2013.01); *H04W 12/084* (2021.01); *H04W 12/77* (2021.01)

(58) Field of Classification Search
  CPC ............. G06Q 10/1095; G06Q 20/322; G06Q 20/3274; G06Q 20/3276; G06Q 50/01
  See application file for complete search history.

(56) References Cited

U.S. PATENT DOCUMENTS

| | | | |
|---|---|---|---|
| D727,961 S | 4/2015 | Zhou et al. | |
| D740,308 S | 10/2015 | Kim et al. | |
| D748,657 S | 2/2016 | Lee et al. | |
| D757,751 S | 5/2016 | Butcher et al. | |
| D768,151 S | 10/2016 | Yoo et al. | |
| D771,122 S | 11/2016 | Matas | |
| D772,930 S | 11/2016 | Vazquez et al. | |
| D788,161 S | 5/2017 | Bauer et al. | |
| 9,674,419 B2 * | 6/2017 | Sexton | H04N 23/631 |
| 9,697,447 B2 * | 7/2017 | Schory | G06K 5/02 |
| D794,675 S | 8/2017 | Liu et al. | |
| D804,504 S | 12/2017 | Hoffman et al. | |
| 9,852,417 B2 * | 12/2017 | Tyler | G06Q 20/321 |
| D813,888 S | 3/2018 | Kim et al. | |
| D826,957 S | 8/2018 | Pillalamarri et al. | |
| D830,384 S | 10/2018 | Lepine et al. | |
| D840,413 S | 2/2019 | Leach et al. | |
| 10,237,277 B2 | 3/2019 | Leach et al. | |
| D867,374 S | 11/2019 | Flood et al. | |
| D886,120 S | 6/2020 | Yuk et al. | |
| 2007/0278316 A1 | 12/2007 | Hovis | |
| 2009/0307232 A1 * | 12/2009 | Hall | G06Q 30/00 235/462.11 |
| 2010/0008265 A1 * | 1/2010 | Freer | H04N 1/00307 455/414.1 |
| 2010/0023506 A1 * | 1/2010 | Sahni | G06F 16/9535 707/E17.014 |
| 2011/0148924 A1 * | 6/2011 | Tapley | G06F 3/011 715/810 |
| 2013/0124855 A1 * | 5/2013 | Varadarajan | G07F 19/20 726/4 |
| 2013/0191394 A1 * | 7/2013 | Bradley | G06Q 50/01 707/738 |
| 2016/0065414 A1 | 3/2016 | Sundermeyer et al. | |
| 2016/0202866 A1 | 7/2016 | Zambetti et al. | |
| 2016/0337358 A1 * | 11/2016 | Tonnelier | H04L 63/108 |
| 2017/0046671 A1 * | 2/2017 | Shauh | G06Q 20/3276 |
| 2017/0076127 A1 * | 3/2017 | Arce | G06K 19/06056 |
| 2017/0344994 A1 * | 11/2017 | Wang | G06Q 20/405 |
| 2018/0048652 A1 | 2/2018 | Leach et al. | |
| 2019/0166131 A1 | 5/2019 | Leach et al. | |

OTHER PUBLICATIONS

Notice of Allowance mailed Jan. 2, 2020 for U.S. Appl. No. 16/264,800, filed Feb. 1, 2019, 20 Pages.
Notice of Allowance mailed Sep. 17, 2018 for U.S. Appl. No. 29/574,394, filed Aug. 15, 2016, 14 Pages.
Notice of Allowance mailed Feb. 19, 2021 for U.S. Appl. No. 29/719,454, filed Jan. 3, 2020, 19 Pages.
Notice of Allowance mailed Oct. 25, 2018 for U.S. Appl. No. 15/237,071, filed Aug. 15, 2016, 41 Pages.
Notice of Allowance mailed Oct. 30, 2019 for U.S. Appl. No. 29/677,613, filed Jan. 22, 2019, 21 Pages.
Office Action mailed Oct. 16, 2019 for U.S. Appl. No. 16/264,800, filed Feb. 1, 2019, 24 Pages.
Office Action mailed May 17, 2018 for U.S. Appl. No. 15/237,071, filed Aug. 15, 2016, 20 Pages.
"What are Kik Codes?," Kik, Aug. 9, 2016, 4 pages, Retrieved from the Internet: URL: https://www.kik.com/blog/what-are-kik-codes/.

* cited by examiner

110 — Username: Joe Smoe

112 — Binary Code: 0011101100011...

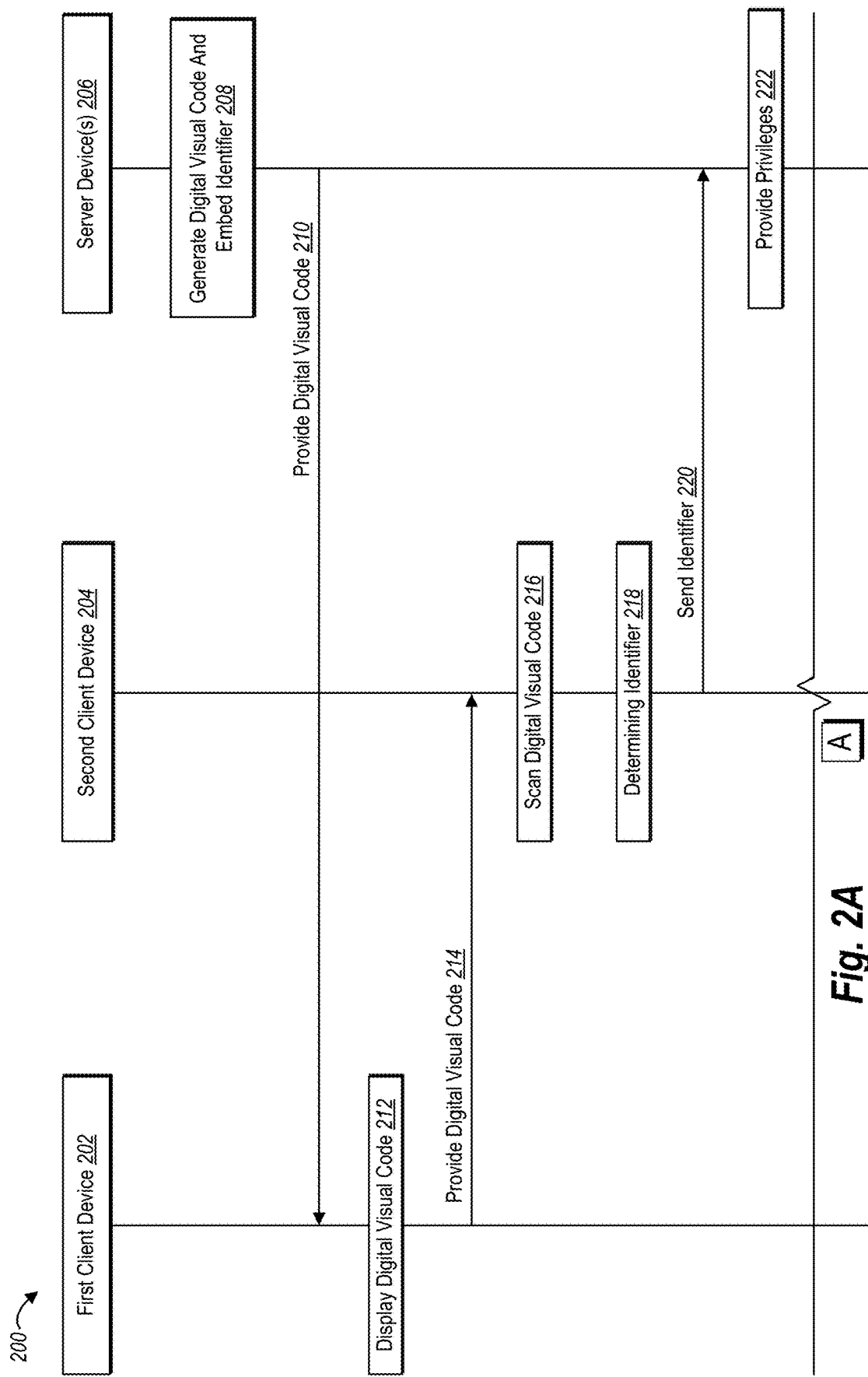

GENERATING AND UTILIZING DIGITAL VISUAL CODES TO GRANT PRIVILEGES VIA A NETWORKING SYSTEM

CROSS-REFERENCE TO RELATED APPLICATIONS

The present application is a continuation of U.S. application Ser. No. 17/654,556, filed on Mar. 11, 2022, which issued as U.S. Pat. No. 11,777,946, which is a continuation of U.S. application Ser. No. 16/841,445, filed on Apr. 6, 2020, which issued as U.S. Pat. No. 11,310,240, which is a continuation of U.S. application Ser. No. 16/264,800, filed on Feb. 1, 2019, which issued as U.S. Pat. No. 10,652,251, which is a continuation of U.S. application Ser. No. 15/237,071, filed Aug. 15, 2016, which issued as U.S. Pat. No. 10,237,277. The aforementioned applications are hereby incorporated by reference in their entirety.

BACKGROUND

In recent years, individuals and business have increasingly turned to mobile computing devices to interact with others. For example, individuals routinely utilize mobile computing devices to send and receive electronic communications, create and coordinate digital calendaring events, or facilitate payment transactions.

Although computing devices and corresponding digital systems allow users to interact in a variety of ways, conventional digital systems still have a variety of problems. For example, in order to interact with others, many conventional digital systems require users to first identify and/or digitally connect with a third party. For instance, in order to send a digital message or payment to another individual, conventional digital systems require a user to somehow identify information corresponding to the other individual. This typically involves asking for, and manually entering, identifying information (e.g., a phone number, e-mail address, or bank account information) or searching through a list of users provided by the digital system.

Users often express frustration with such conventional digital systems. Indeed, the process of searching for, or otherwise trying to obtain, an identifier corresponding to other users of a digital system often requires an extensive amount of time and leads to user frustration. For example, upon meeting a new person, users often express frustration with the process of exchanging and manually entering personal information into mobile devices. Similarly, although some conventional digital systems provide searching user lists, identifying other parties utilizing such lists is often unreliable (e.g., users often incorrectly select a different user with a similar name) and inconvenient (e.g., users often take a significant amount of time to identify the correct user). One will appreciate that such problems are exacerbated when searching among millions or billions of users many with the same or similar names or other identifying information.

SUMMARY

One or more embodiments described below provide benefits and/or solve one or more of the foregoing or other problems in the art with systems and methods for generating and utilizing digital visual codes to identify individuals or businesses within a networking system. In particular, in one or more embodiments, the disclosed systems and methods generate digital visual codes utilizing a digital array comprising a plurality of digital visual code points arranged in patterns. For instance, in one or more embodiments, the disclosed systems utilize a digital array to generate a digital visual code by embedding user identifiers in the digital visual code points of the digital visual array. Users can then utilize the digital visual code to identify users and gain privileges with a networking application. For instance, a user of a first device can display a digital visual code, a second device can scan the digital visual code, and the second device uses the scanned code to identify the first user.

For example, in one or more embodiments, the disclosed systems and methods generate a digital visual code by embedding an identifier of an account of a first user with a networking system into a digital array comprising a plurality of digital visual code points and one or more anchor points. In particular, the disclosed systems and methods affirmatively mark digital visual code points from the plurality of digital visual code points in accordance with the identifier of the first user and connect adjacent affirmative digital visual code points in the digital visual code. In addition, the disclosed systems and methods provide the digital visual code to a first remote client device of the first user. Moreover, the disclosed systems and methods receive, from a second remote client device of a second user, the identifier of the first user obtained by scanning and decoding the digital visual code. Furthermore, in response to receiving the identifier from the second remote client device of the second user, the disclosed systems and methods identify the account of the first user with the networking system and grant one or more privileges to the second remote client device of the second user in relation to the account of the first user with the networking system.

By utilizing digital visual codes, the disclosed systems and methods assist users in quickly, accurately, and securely identifying (and interacting with) other individuals, groups, and/or businesses via a networking system. For example, the disclosed systems and methods allow a first user to quickly (i.e., without manually exchanging identifying information or searching through user lists) identify a second user by scanning a digital visual code displayed on a computing device of the second user.

Moreover, utilizing the digital visual code, the disclosed systems and methods allow a first user to easily interact with a second user. Indeed, in one or more embodiments the disclosed systems and methods operate in conjunction with a networking system (e.g., a digital communication system and/or digital social networking system) that allow users to utilize digital visual codes to quickly and efficiently interact via the networking system. For example, a first user can access information regarding an account of a second user (e.g., a user profile), add the second user as a contact (e.g., add as a "friend" in the digital social networking system), initiate payment transactions with the second user, invite the second user to an event, etc.

Additional features and advantages of will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings.

FIGS. 2A-2C illustrate sequence diagrams of a plurality of steps in methods of generating and utilizing a digital visual code in accordance with one or more embodiments.

DETAILED DESCRIPTION

Figure 1A:
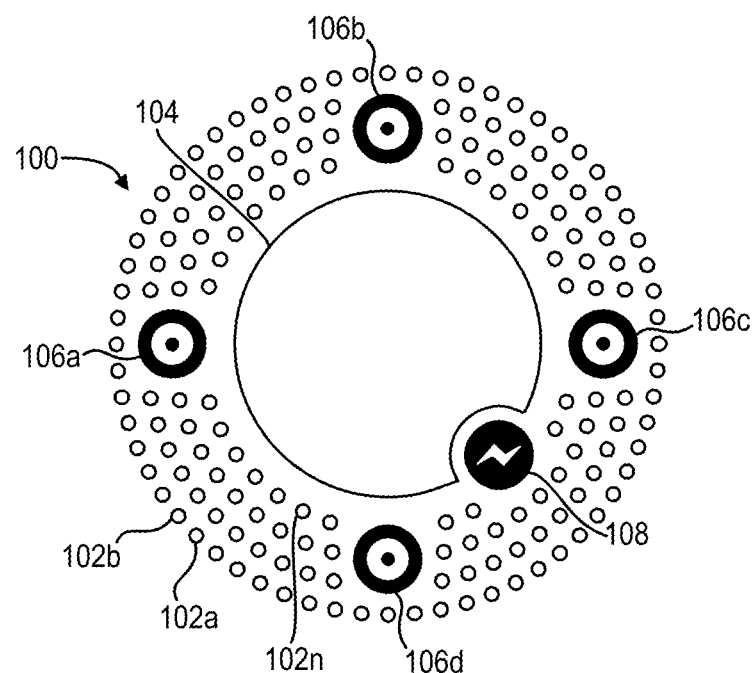
FIGS. 1A-1E illustrate a representation of generating a digital visual code embedding an identifier of an account of a user in accordance with one or more embodiments.

One or more embodiments of the present invention include a digital identification system that generates and utilizes digital visual codes. In particular, in one or more embodiments, the digital identification system utilizes personalized digital visual codes to quickly, efficiently, and securely identify a third party. More specifically, in one or more embodiments, the digital identification system generates a digital visual code that allows a first user to identify and interact with a second user. To illustrate, in one or more embodiments, the digital identification system generates a digital visual code comprising a plurality of digital visual code points arranged in a pattern that embed an identifier of a first user. A first computing device of the first user can display the digital visual code, a second computing device of a second user can scan and decode the digital visual code, and the digital identification system can identify the first user based on the digital visual code.

For example, in one or more embodiments, the digital identification system generates a digital visual code by embedding an identifier of an account of a first user with a networking system into a digital array comprising a plurality of digital visual code points and one or more anchor points. In particular, the digital identification system affirmatively marks digital visual code points from the plurality of digital visual code points in accordance with the identifier of the first user and connects adjacent affirmative digital visual code points. In addition, the digital identification system provides the digital visual code to a first remote client device of the first user. Moreover, the digital identification system receives, from a second remote client device of a second user, the identifier of the first user obtained by scanning and decoding the digital visual code. Furthermore, in response to receiving the identifier from the second remote client device of the second user, the digital identification system identifies the account of the first user with the networking system and grants one or more privileges to the second remote client device of the second user in relation to the account of the first user with the networking system.

By utilizing digital visual codes, the digital identification system quickly, efficiently, and securely identifiers and provides privileges to users so they can more easily interact utilizing computing devices. Indeed, rather than searching through lists of other users or manually exchanging information, the digital identification system utilizes digital visual codes to allow users to conveniently and reliably identify and interact with other users.

As mentioned above, the digital identification system can utilize digital visual codes to provide one or more privileges. For example, in one or more embodiments, the digital identification system is implemented in conjunction with a digital communication application. Accordingly, upon receiving an identifier corresponding to a first user of a first computing device from a second computing device of a second user, the digital identification system can initiate an electronic communication thread between the first user and the second user. Similarly, the digital identification system can utilize the digital communication application to initiate a payment transaction between the first user and the second user.

Moreover, in one or more embodiments, the digital identification system is implemented in conjunction with a social networking system (and corresponding social networking application). Accordingly, the digital identification system can identify the second user and establish a connection between the first user and the second user (e.g., add the first user as a "friend" of the second user). Similarly, the digital identification system can send an invitation from the first user to the second user corresponding to a digital event.

As mentioned above, in one or more embodiments, the digital identification system generates digital visual codes. In particular, the digital identification system can embed an identifier of an account of a user with a networking system in a digital visual code by encoding the identifier in a plurality of digital visual code points in a digital array. For instance, the digital identification system can generate a digital array of digital code points arranged in a plurality of concentric circles. The digital identification system can convert a username, user ID, or hash to a binary code and affirmatively mark the digital visual code points in the plurality of concentric circles in accordance with the bits of the binary code.

Furthermore, in one or more embodiments, the digital identification system also connects adjacent digital visual code points in the digital array. For instance, in one or more embodiments, the digital identification system connects adjacent digital visual code points to aid in more efficient capture of the digital visual code by a scanning device and to improve the appearance of the resulting digital visual code. Indeed, by connecting adjacent digital visual code points, users often find digital visual codes of the digital identification system more contiguous and visually appealing than other conventional systems.

In addition, in one or more embodiments, the digital identification system generates a digital visual code with one or more anchor points and orientation anchors. In particular, in one or more embodiments, the digital identification system generates a digital visual code with anchor points that assist in identifying a relative location of digital visual points in the digital visual code and to make scanning and decoding digital visual codes more efficient. Similarly, the digital identification system can utilize orientation anchors to determine a proper orientation or alignment in decoding the digital visual code. For example, experimenters have determined that utilizing an orientation anchor as described herein can increase the speed of recognizing and decoding digital visual codes by a factor of four.

Furthermore, in one or more embodiments, the digital identification system provides digital visual codes in a conjunction with one or more digital media items. For example, the digital identification system can provide a digital visual code with digital visual code points in concentric circles surrounding a user profile picture or video. In this manner, users can more easily recognize the digital visual code as an object encoding an identifier. Moreover, utilizing a digital media item can further increase the security of digital visual codes by allowing users to visually confirm that a digital visual code corresponds to a desired account or action.

In addition to an identifier of an account of a user, the digital identification system can also embed other information into a digital visual code. For example, the digital identification system can embed an action (i.e., an action identifier) in a digital visual code. To illustrate, the digital identification system can generate a digital visual code that embeds an action identifier indicating that a first user wishes to make a payment to a second user. The second user can scan the digital visual code and automatically initiate a payment transaction between the first user and the second user.

In addition to an action identifier corresponding to a payment transaction, the digital identification system can embed a variety of other action identifiers. For instance, the digital identification system can embed action identifiers corresponding to sending an event invitation, initiating a communication thread, or connecting via a social networking system. Moreover, the digital identification system can embed other information, such as a payment amount, a coupon or discount, an expiration time, or calendar event information into a digital visual code.

The digital identification system can also modify digital visual codes. For example, after a certain amount of time (or a certain number of uses), the digital identification system can modify a digital visual code corresponding to a user and/or action. In this manner, the digital identification system can ensure that digital visual codes are not improperly utilized or otherwise compromised.

The digital identification system can also modify digital visual codes to improve the efficiency of granting privileges. For example, in one or more embodiments, digital identification system generates a single-use, verified digital visual code. In particular, the digital identification system can generate a single-use, verified digital visual code that, when scanned, causes the digital identification system to grant privileges to a second user without additional express verification from a first user. In this manner, the digital identification system can allow users to automatically connect, complete payment transactions, and/or or invite to events without any additional user interaction, while also ensuring that verified digital visual codes are not improperly exploited.

Turning now to FIGS. 1A-1E, additional detail will be provided regarding generating and utilizing digital visual codes in accordance with one or more embodiments of the digital identification system. In particular, FIG. 1A illustrates a digital array 100 comprising a plurality of digital visual code points 102a-102n surrounding a digital media item area 104. Furthermore, the digital array 100 includes four anchor points 106a-106d and an orientation anchor 108. As outlined below, the digital identification system can encode an identifier in the digital array 100 to create a digital visual code.

As used herein, the term "digital visual code" refers to a machine-readable matrix. In particular, the term "digital visual code" includes a plurality of modules (e.g., dots, blocks, or other shapes) encoded in a digital array that can be read by an imaging (e.g., scanning) device. For example, in one or more embodiments, a digital visual code comprises a plurality of marked digital visual code points arranged in a digital array of concentric circles surrounding a digital media item. In addition to a plurality of concentric circles, digital visual codes can also include other designs or shapes (e.g., a rounded circle or other shape). In addition to digital visual code points, as described in greater detail below, a digital visual code can also include one or more anchor points and/or orientation anchors.

As used herein, the term "digital array" refers to a matrix of digital visual code points. In particular, the term "digital array" includes a plurality of digital visual code points arranged in a pattern or shape. For example, as illustrated in FIG. 1A, the digital array 100 comprises the plurality of digital visual code points 102a-102n arranged in four concentric circles around the digital media item area 104.

As used herein, the term "digital visual code points" refers to entries or digital items in a digital array. In particular, the term "digital visual code points" refers to digital items in a digital visual array that can be toggled (e.g., on or off, marked or unmarked). Indeed, in relation to the embodiment of FIG. 1A, the digital visual code points 102a-102n can be marked to encode one or more identifiers.

As shown in FIG. 1A, a digital array can also include one or more anchor points and/or one or more orientation anchors. As used herein, the term "anchor points" refers to a digital item embedded in a digital visual code that provides a visual reference for the location of digital visual code points. In particular, the term "anchor points" includes a circle, square, dot, or other shape in a digital visual code that provides a visual reference to assist an imaging device to decode a digital visual code and/or digital visual code points. Specifically, in relation to FIG. 1A, the digital array 100 comprises the four anchor points 106a-106d, which are represented as a dot encompassed by a larger circle. As described in greater detail below, the digital identification system utilizes the anchor points 106a-106d to accurately identify the location of digital visual code points in decoding a digital visual code.

Similarly, as used herein, the term "orientation anchor" refers to a digital item embedded in a digital visual code that provides a visual reference for orientation of a digital visual code and/or digital visual code points. In particular, the term "orientation anchor" refers to a standard image portraying a shape, symbol, mark, or brand with a particular orientation (e.g., rotation in relation to the remainder of the digital visual code). To illustrate, with regard to the embodiment of FIG. 1A, the digital array 100 comprises the orientation anchor 108 which is represented as a circle with a brand symbol (i.e., a trademark for the FACEBOOK® MESSENGER® software program). As described in greater detail below, the digital identification system can utilize the orientation anchor 108 to orient a digital visual code.

In one or more embodiments, the digital identification system generates digital visual code points, anchor points, orientation points, and/or the digital media item utilizing particular dimensions. For example, in one or more embodiments, the digital identification system increases the speed and efficiency of scanning and decoding a digital visual code by utilizing defined dimensions amongst the digital visual code points, the anchor points, orientation points, and/or the digital media item area.

To illustrate, with regard to FIG. 1A, the digital visual code points 102a-102n each have a diameter of one unit. The anchor points 106a-106d and the orientation anchor 108 each have a diameter of five units (relative to the one unit of the digital visual code points 102a-102n). Moreover, the digital media item area 104 has a diameter of 22 units (relative to the digital visual code points 102a-102n). In addition, each concentric circle in the array is separated by a distance of one unit, while the digital media item 104 is a distance of two units from the inner-most concentric circle of digital visual codes.

It will be appreciated that the digital identification system can utilize different relative dimensions in other embodiments. For example, the digital visual code points 102a-102n can each have a diameter of one unit, the anchor points 106a-106d can each have a diameter of five units, the orientation anchor 108 can have a diameter of eight units, and the digital media item area 104 can have a diameter of thirty-eight units.

In addition, although FIG. 1A illustrates a particular shape of a digital array with a particular arrangement of digital visual code points (i.e., digital visual code points in four concentric circles) anchor points, and an orientation anchor, it will be appreciated that the digital identification system can utilize a digital array with a different shape, with a different arrangement of digital visual code points, a different number and arrangement of anchor points, and a different number and arrangement of orientation anchors. For example, rather than utilizing four anchor points aligned with horizontal and vertical axes of the digital array, the digital identification system can utilize a different number (e.g., two, five, at least three, or some other number) of anchor points arranged at some other location in relation to the digital array (e.g., above, below, outside, or some other location). Similarly, rather than arranging digital visual code points in concentric circles, the digital identification system can generate a digital array with digital visual code points in a variety of other shapes and arrangements (e.g., rows and columns in a rectangle, triangle, rounded square, or squircle).

Moreover, although FIG. 1A illustrates an orientation anchor with a particular brand symbol, it will be appreciated that the digital identification system can generate an orientation anchor utilizing a different symbol. For example, in one or more embodiments, the digital identification system allows a user to generate an orientation anchor with a particular symbol or mark. To illustrate, the digital identification system can provide a user interface that permits a business to select an orientation anchor that incorporates a trade mark or brand specific to the business. Similarly, the digital identification system can provide a user interface that permits an individual to select an orientation anchor with a design, symbol, or character of their choosing.

As mentioned previously, in one or more embodiments, the digital identification system embeds one or more identifiers into a digital array to generate a digital visual code. As used herein, the term "identifier" refers to a sequence of characters used to identify a person or thing. In particular, the term "identifier" includes a username, user ID, hash, or binary code indicating one or more users (and/or one or more accounts of one or more users). Depending on the embodiment, the digital identification system can utilize a username, user ID, hash, or binary code corresponding to a user account as an identifier and encode the identifier into a digital visual code.

As used herein, the term "account" refers to a collection of data associated with one or more users. In particular, the term "account" includes protected information regarding a user of a networking system that can be accessed by users and/or computing devices having one or more privileges. For example, the term "account" can include user contact information, user history, user communications, user posts, user comments, digital media items, purchases, interactions, contacts (e.g., friends), digital events corresponding to digital calendars, demographic information, payment transactions, and/or payment information.

As used herein the term "networking system" refers to a plurality of computing devices connected via a network to transfer information between the computing devices. For example, a networking system includes a social networking system (as described in greater detail below). Similarly, a networking system includes a digital communication system (i.e., a plurality of computing devices for sending electronic communications across a network between users).

Figure 1B:

For example, FIG. 1B illustrates a representation of generating an identifier corresponding to an account of a user of a networking system in accordance with one or more embodiments. In particular, FIG. 1B illustrates the digital identification system converting a username 110 corresponding to a user account into a binary code 112.

As an example specific to an embodiment in which the digital identification system is integrated with a social networking system, a user may have a username, a user ID, and a hash associated with their profile/account with the social networking system. The username can comprise a string of characters chosen by the user by which the user chooses to identify themselves on the social networking system. The username may not be unique to the user. For example, the user may select Joe Smoe as the username. There may be ten, hundreds, or even thousands of other users that selected Joe Smoe as a username. The social networking system can associate one or more of a user ID or a unique identifier with the user to uniquely identify the user. For example, a user ID for the user may comprise a unique string of characters based on the username. In particular, in one or more embodiments, the user ID can comprise the username with a random string, such as joe.smoe1466, where 1466 is a randomly generated string. The user ID can allow the networking system to identify and link to an account/data of the user. In still further embodiments, the networking system can utilize a hash. For example, the hash for the user can be a string of numbers or alphanumeric characters (such as 606664070) obtained by performing a hashing algorithm on the user ID.

In one or more embodiments, the digital identification system transforms the username, user ID, and/or hash into a binary code. For example, the digital identification system can transform alphanumeric characters into binary to generate a binary code corresponding to the user. Thus, as illustrated in relation to FIG. 1B, the digital identification system transforms the username 110 into the binary code 112. More specifically, the digital identification system can identify a user ID corresponding to the username, transform the user ID into a hash using a hashing algorithm, and transform the hash into the binary code 112.

It will be appreciated that although FIG. 1B illustrates generating a binary code from a username of a single user, the digital identification system can generate a binary code that reflects a group, a plurality of users, or a business. For example, in one or more embodiments, the digital identification system operates in conjunction with a social networking system where users can create and join groups (e.g., a collection of users within the social networking system that share a common interest, such as users that like running or users that are fans of a particular sport). The digital identification system can generate a binary code corresponding to the group.

Similarly, the digital identification system can generate a binary code corresponding to a plurality of users. For example, the digital identification system can generate a binary code that reflects a username, user ID, or hash of a plurality of users of a social networking system. As discussed in greater detail below, in this manner, the digital identification system can embed information regarding a plurality of users in a digital visual code.

Furthermore, in addition to identifying users, the digital identification system can also generate a binary code (or other identifier) that reflects other information. For example, the digital identification system can generate an action identifier corresponding to a particular action. As used herein, the term "action identifier" refers to digital information indicating an action. For example, an action identifier includes a code that indicates an action for a computing device to perform. An action identifier can take a variety of forms. In one or more embodiments, the digital identification system can generate a binary code that reflects a particular action. For example, the digital identification system can generate a binary code that indicates initiating a payment transaction, initiating a messaging thread, adding a user to a digital event, connecting to an individual (e.g., adding an individual as a "friend"), or some other action. An action identifier can comprise a binary code separate from (e.g., in addition to) a user identifier or the action identifier can be part of the same binary code as a user identifier (e.g., the digital identification system can generate a binary code that identifies both a user and an action).

In addition, the digital identification system can generate a binary code (or other identifier) that reflects information regarding a first user, a transaction, an event, or other information. For example, the digital identification system can generate a binary code that reflects a price, a product, a coupon, a time, a place, or other information.

Figure 1C:
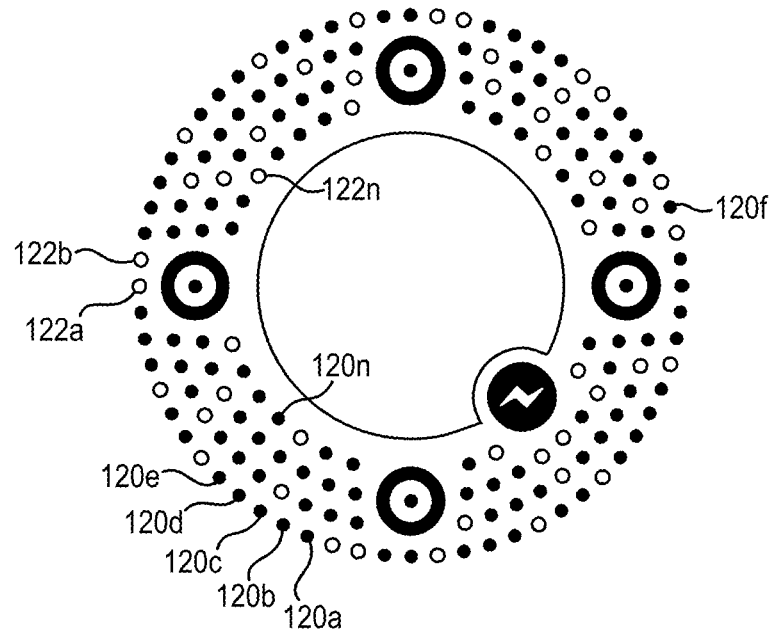

As mentioned above, in one or more embodiments, the digital embeds one or more identifiers into a digital array to generate a digital visual code. In particular, FIG. 1C illustrates embedding an identifier into the digital array 100. Specifically, FIG. 1C illustrates embedding the binary code 112 into the digital array 100.

As shown, the digital identification system embeds the bits of the binary array into corresponding digital visual code points 102a-102n of the digital array 100. In particular, the digital identification system affirmatively marks digital visual code points based on the binary code 112 to embed the binary code 112 into the digital array 100. Thus, in one or more embodiments, bits marked as "1" in the binary code 112 are encoded in the digital array 100 by affirmatively marking a corresponding digital visual code point in the digital array 100. Specifically, in relation to FIG. 1C, the affirmatively marked digital visual code points 120a-120n correspond to "1" values in the binary code 112. The unmarked digital visual code points 122a-122n corresponding to "0" values in the binary code 112.

In addition to encoding an identifier corresponding to an account of a user, the digital identification system can also embed other information in a digital visual code. For example, as mentioned previously, in one or more embodiments, the digital identification system embeds an action identifier in a digital visual code. For example, the digital identification system can generate the binary code 112 such that the binary code 112 includes an indication to begin a message thread, connect a contact (e.g., add a "friend"), initiate a payment transaction, apply a discount to a purchase (e.g., a coupon), initiate a telephone call, share contact information, or send an invitation to an event. Moreover, the digital identification system can then encode the binary code 112 that reflects the action identifier into the digital array 100.

Figure 1D:
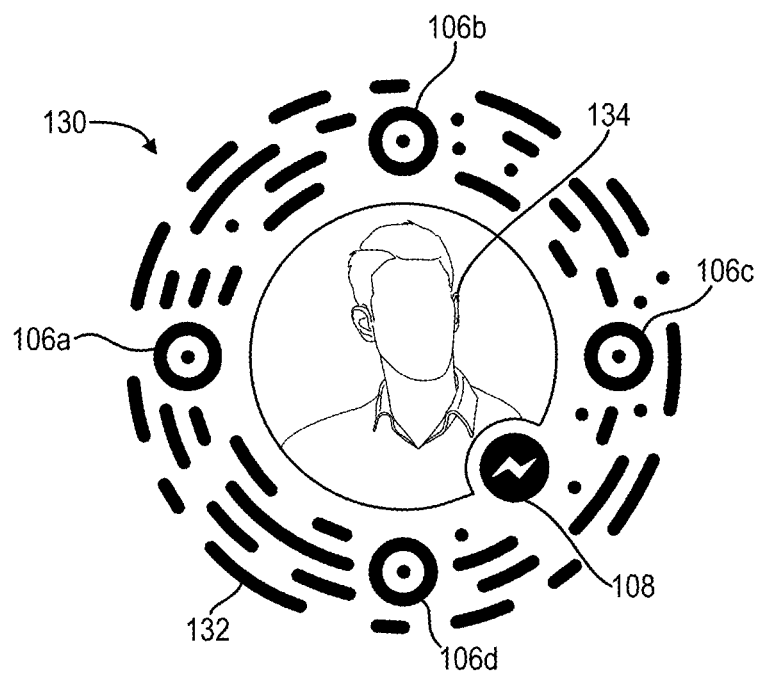

As discussed previously, the digital identification system can also connect affirmatively marked digital visual code points to generate a digital visual code. In particular, in one or more embodiments, the digital identification system connects adjacent digital visual code points with digital curves and removes unmarked digital visual code points. For example, FIG. 1D illustrates a digital visual code 130 based on the affirmatively marked digital visual codes points 120a-120n.

As shown, the digital visual code 130 incudes the digital curve 132. The digital identification system generates the digital curve 132 based on the adjacent, affirmatively marked digital visual code points 120a-120e. In particular, the digital identification system determines that the digital visual code points 120a-120e are affirmatively marked and adjacent digital visual code points within a concentric circle of the digital array 100. Accordingly, the digital identification system connects the digital visual code points 120a-120e with the digital curve 132 in generating the digital visual code 130.

In one or more embodiments, the digital identification system also removes digital visual code points that are not affirmatively marked. For example, the digital visual code points 122a, 122b are not affirmatively marked. Accordingly, the digital visual code 130 leaves open space corresponding to the location of the digital visual code points 122a, 122b.

Aside from toggling digital visual code points, the digital identification system can also embed information in the digital visual code in other ways. For example, in one or more embodiments, the digital identification system can vary the color or thickness of digital curves (and/or digital visual code points) to further embed additional information. For example, the digital identification system can utilize a thick digital curve to encode additional bits from a binary code or to indicate a verified digital visual code.

Furthermore, in addition to connecting adjacent points within concentric circles, in one or more embodiments, the digital identification system can also connect adjacent points across concentric circles. For example, the digital identification system can connect two digital visual code points in two different concentric circles by a line or digital curve.

As mentioned above, a digital visual code can also include a digital media item. For example, FIG. 1D illustrates the digital identification system embedding a digital media item 134 in the digital media item area 104.

As used herein, the term "digital media item" refers to any digital item capable of producing a visual representation. For instance, the term "digital visual media" includes digital images, digital video, digital animations, digital illustrations, etc. As used herein, the term "digital image" refers to any digital symbol, picture, icon, or illustration. For example, the term "digital image" includes digital files with the following, or other, file extensions: JPG, TIFF, BMP, PNG, RAW, or PDF. Similarly, as used herein, the term "digital video" refers to a digital sequence of images. For example, the term "digital video" includes digital files with the following, or other, file extensions: FLV, GIF, MOV, QT, AVI, WMV, MP4, MPG, MPEG, or M4V.

With regard to the embodiment of FIG. 1D, the digital media item 134 comprises a profile picture (or video) corresponding to an account of a user. Specifically, a user selects a digital image (or video) and associates the digital image with a user account (e.g., uploads the digital image to a remote server storing account information). The digital identification system can access the digital image (or video) and display the digital image (or video) as part of the digital visual code 130.

In one or more embodiments, the digital identification system selects a digital media item that relates to a particular action (e.g., an action identifier). For example, if the digital identification system embeds an action identifier corresponding to sending a payment, the digital identification system can select a digital media item based on the embedded action identifier that relates to a payment transaction. For example, the digital identification system can overlay an image of a dollar bill (or a dollar sign with a payment amount) onto a profile picture. Similarly, the digital identification system can overlay a video of money falling (or some other video related to a payment transaction).

The digital visual code can select and embed similar digital media items in relation to other actions (i.e., action indicators) embedded in a digital visual code. For instance, a digital visual code embedding an action indicator for sending an invitation to an event can include a digital media item (e.g., picture or video) related to the event (e.g., an image of a calendar or an image of the location of the event).

Figure 1E:
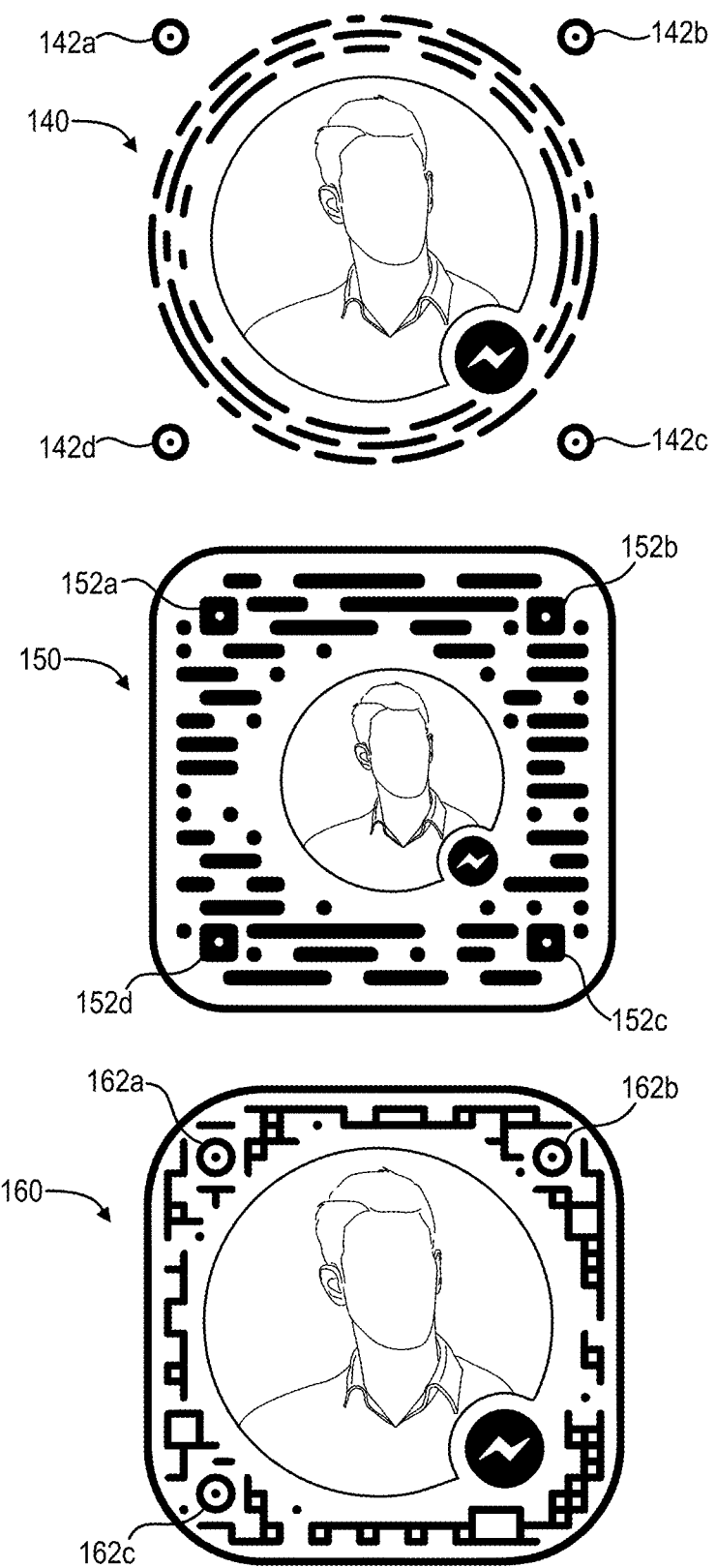

Although the embodiment of FIG. 1D illustrates the digital visual code 130 with a particular arrangement of curves, digital visual code points, anchor points, orientation anchor(s), and digital media item(s), it will be appreciated that different embodiments can utilize different arrangements. For example, FIG. 1E illustrates three digital visual codes 140, 150, and 160 with alternative arrangements of various components.

For instance, the digital visual code 140 utilizes digital visual code points in concentric circles, similar to the digital visual code 130 of FIG. 1D. However, the digital visual code 140 utilizes three concentric circles of digital visual code points (and connected curves) rather than four. Moreover, the digital visual code 140 includes anchor points 142a-142d outside of the concentric circles of digital visual code points.

Furthermore, unlike the digital visual code 130, the digital visual code 150 utilizes digital visual code points within a rounded square. In addition, rather than utilizing anchor points that comprise dots within a circle, the digital visual code 150 utilizes anchor points 152a-152d that comprise dots within a rounded square.

Moreover, like the digital visual code 150, the digital visual code 160 comprises a plurality of digital visual code points within a rounded square. However, the digital visual code 160 connects adjacent digital visual code points within a digital array in two different dimensions (i.e., vertically and horizontally). Moreover, rather than utilizing four anchor points, the digital visual code 160 utilizes three anchor points 162a-162c.

Figure 2B:
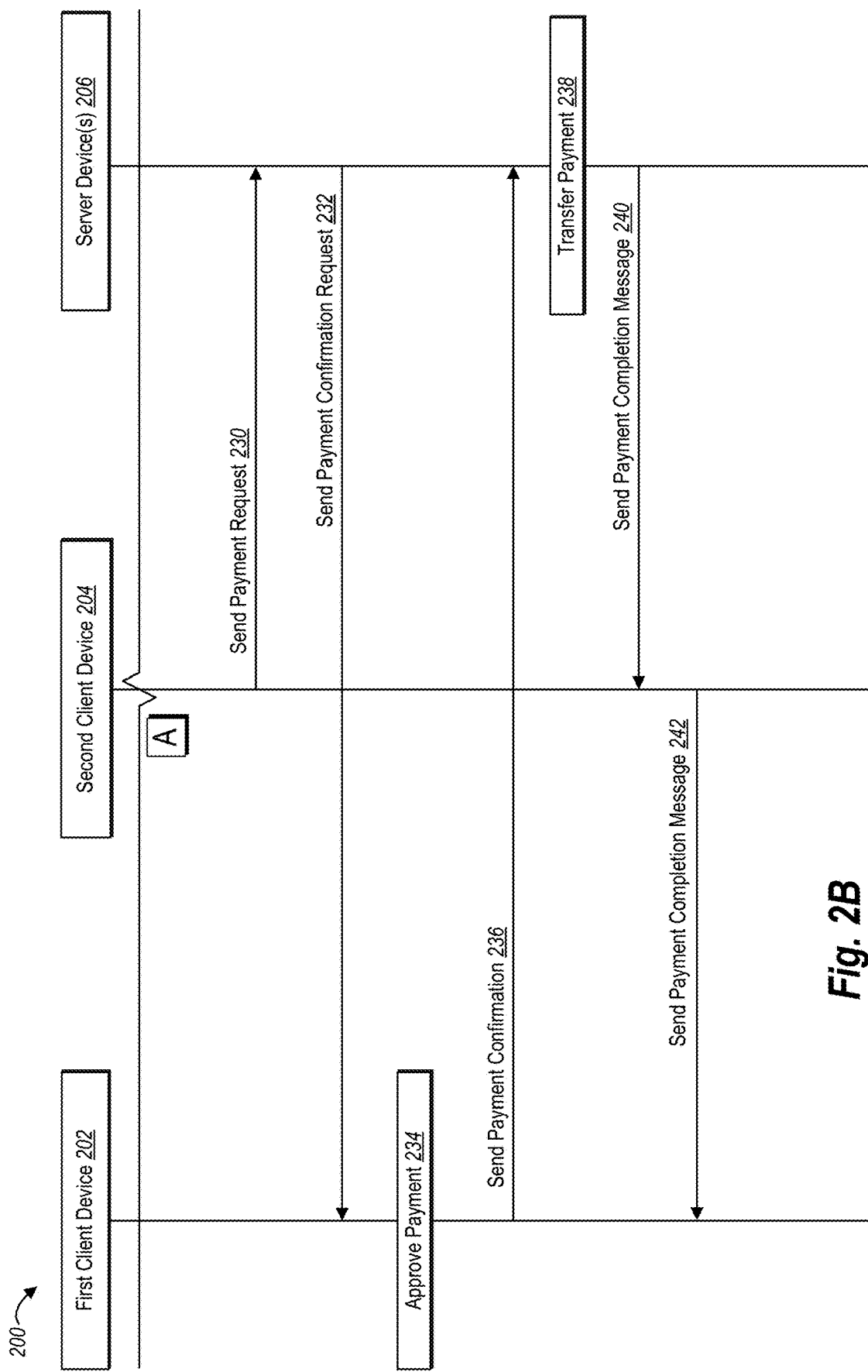
Figure 2C:
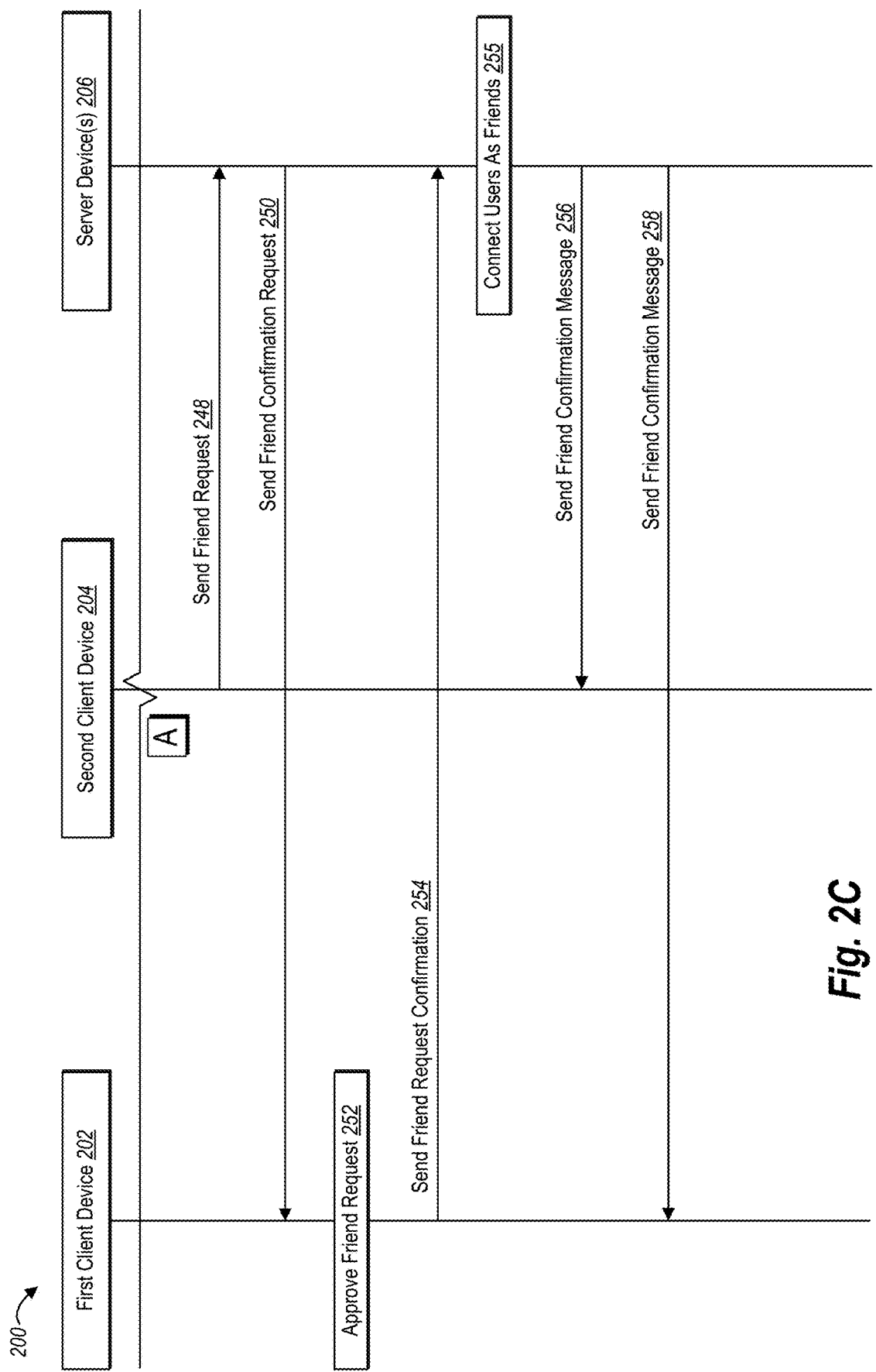

As discussed above, the digital identification system can generate and utilize digital visual codes to provide one or more privileges to a client device. For example, FIGS. 2A-2C illustrates sequence diagrams comprising steps that a digital identification system 200 performs in generating and utilizing digital visual codes. In particular, FIG. 2A illustrates steps that the digital identification system 200 performs in generating a digital visual code and providing privileges. FIGS. 2B-2C illustrate steps in various embodiments that provide particular privileges based on the digital visual code of FIG. 2A.

As used herein, the term "privilege" refers to a right to access digital information and/or perform an action via a computing device. In particular, the term "privilege" includes a right to access information in relation to an account of a user of a networking system and/or perform an action via a computing device in relation to the user. The term "privilege" can include a digital item, such as an access token, provided to a computing device for utilization in accessing information. The term "privilege" can also include unlocking features or capabilities of a software application. To illustrate, the digital identification system can grant a user a privilege to invite another user to access information regarding a user (e.g., view a user's profile information), connect via a networking system (e.g., add another user as a "friend"), and/or obtain an event invitation. Additional detail regarding privileges available via the digital identification system is described below.

As shown in FIG. 2A, the digital identification system 200 can be implemented by a first client device 202, a second client device 204, and server device(s) 206. The digital identification system 200 can cause each of the first client device 202, the second client device 204, and the server device(s) 206 to perform a variety of steps (e.g., steps 208-258) as described below.

In one or more embodiments, the first client device 202 and/or the second client device 204 comprise computing devices operably connected to an imaging (e.g., scanning) device. For example, in one or more embodiments, the first client device 202 and the second client device 204 are operably connected to one or more scanning devices capable of scanning digital visual codes. More particularly, in one or more embodiments, the first client device 202 and the second client device 204 comprise mobile devices, such as smartphones or tablets, which include scanning devices capable of scanning digital visual codes. In addition to mobile devices, the first client device 202 and the second client device 204 can comprise a variety of other types of computing device. Additional detail regarding such computing devices is provided below (e.g., in relation to FIG. 8).

As illustrated in FIG. 2A, in addition to the first client device 202 and the second client device 204, the digital identification system 200 can also be implemented in part by the server device(s) 206. The server device(s) 206 may generate, store, receive, and/or transmit data. The server device(s) 206 can comprise a data server, a communication server, and/or a web-hosting server. Moreover, in relation to FIGS. 2A-2C, the server device(s) 206 host a networking system utilized by a first user of the first client device and a second user of the second client device.

As shown in FIG. 2A, the digital identification system 200 can utilize the server device(s) 206 to perform the step 208 of generating a digital visual code and embedding an identifier. Indeed, as described above, the server device(s) 206 can generate a digital visual code that includes an identifier of an account associated with a user. As described above, the server device(s) 206 can also embed other information in the digital visual code (e.g., an action identifier, additional information regarding a user, an event, and/or a payment transaction).

As shown in FIG. 2A, the server device(s) 206 can also perform the step 210 of providing the digital visual code to the first client device 202. Moreover, upon receiving (and/or storing) the digital visual code, the first client device can perform the step 212 of displaying the digital visual code. For instance, the first client device 202 can display the digital visual code via a display device operatively coupled to the first client device 202 (e.g., a touchscreen of a mobile phone).

The first client device 202 can also perform the step 214 of providing the digital visual code to the second client device 204. For example, a user can show the digital visual code displayed on the first client device 202 to the second client device 204. To illustrate, the step 214 can comprise a user of the first client device moving a display screen of the first client device 202 into view of a scanning device of the second client device 204.

As illustrated in FIG. 2A, the second client device 204 can also perform the step 216 of scanning the digital visual code. As mentioned previously, the second client device 204 can comprise a smartphone with an imaging (e.g., scanning) device. Thus, the step 216 can comprise utilizing a smartphone to scan the digital visual code.

In one or more embodiments, the client devices 202, 204 include an installed software application capable of analyzing, processing, decoding, and/or interpreting digital visual codes. For example, in one or more embodiments, the server device(s) 206 provide a software application (e.g., a digital communication application or social networking application) that includes data for interpreting and/or decoding a particular digital visual code format (e.g., the same digital code format utilized by the server device(s) 206 in relation to step 208 to generate the digital visual code).

As shown in FIG. 2A, the second client device 204 can also perform the step 218 of determining an identifier. In particular, the second client device 204 can determine the identifier from the digital visual code. For instance, the step 218 can comprise decoding the digital visual code (e.g., utilizing an installed software application capable of processing the digital visual code). For example, upon scanning the digital visual code, the second client device 204 can decode and identify information embedded in the digital code. In particular, the second client device 204 can determine an identifier of an account associated with the first user of the first client device 202 embedded in the digital visual code. Similarly, the second client device 204 can identify action identifiers or other information embedded in the digital visual code.

More specifically, in one or more embodiments, determining the identifier comprises decoding a binary code from the digital visual code. Moreover, determining the identifier can also comprise identifying a hash from the binary code.

As shown in FIG. 2A, the second client device 204 can also perform the step 220 of sending the identifier to the server device(s) 206. For example, the second client device 204 can send a binary code and/or hash to the server device(s) 206.

Moreover, upon receiving the identifier, the server device(s) 206 can perform the step 222 of providing privileges. For instance, in one or more embodiments, the server device(s) 206 receive the identifier and identify the first user of the first client device 202 based on the identifier. To illustrate, the server device(s) 206 can receive a binary code or hash and identify an account corresponding to the first user based on the binary code or hash. The server device(s) 206 can authenticate the binary code or hash, and then provide privileges to the second client device 204.

As discussed above, the server device(s) 206 can provide a variety of privileges. For example, in one or more embodiments, the server device(s) 206 can provide access to information in an account associated with the first user of the first client device 202. For instance, the server device(s) can provide information regarding common connections (e.g., shared "friends) between the first user of the first client device 202 and the second user of the second client device 204. Similarly, the server device(s) 206 can provide a username, user ID, contact information, location information, employment information, or other information regarding the first user stored in the first user's account.

The step 222 of providing privileges can also involve a variety of additional steps unique to particular privileges. For instance, FIGS. 2B-2C illustrate additional steps in relation to different privileges provided by the digital identification system 200. For example, FIG. 2B illustrates the digital identification system 200 performing (via the first client device 202, the second client device 204, and the server device(s) 206) steps 230-242 in completing a payment transaction between a first user of the first client device 202 and a second user of the second client device 204.

In particular, FIG. 2B shows that upon receiving an identifier from the second client device 204, the server device(s) 206 can receive a payment request. In particular, as shown, the second client device 204 can perform the step 230 of sending a payment request to the server device(s) 206.

For example, in one or more embodiments, upon sending the identifier to the server device(s) 206, the server device(s) 206 can provide a privilege to the second client device 204, allowing the second client device 204 to initiate a payment transaction with the first user of the first client device 202. Specifically, the server device(s) 206 can enable functionality within a software application running on the second client device 204. For instance, the server device(s) 206 can enable one or more selectable elements via a user interface of the second client device 204 that allow the second user of the second client device 204 to request a payment transaction from the first user. Upon user interaction with the one or more selectable elements, the second client device 204 sends the payment request to the server device(s) 206 (e.g., identifying the first user, an amount, and/or a product).

As shown in FIG. 2B, upon receiving the payment request, the server device(s) 206 can perform the step 232 of sending a payment confirmation request to the first client device 202. In addition, the first client device 202 can perform the step 234 of approving the payment. For example, in one or more embodiments, the first client device 202 provides a user interface to the first user of the first client device 202 requesting approval of the payment (e.g., displaying a payment amount, a payor, a payee, a purchase item, or other information regarding the payment transaction for approval). Moreover, in one or more embodiments, the step 234 comprises obtaining and authenticating verification credentials (e.g., password, passcode, log in information, or other credentials).

As illustrated in FIG. 2B, the first client device 202 also performs the step 236 of sending a payment confirmation to the server device(s) 206. Moreover, upon receiving the payment confirmation, the server device(s) 206 can perform the step 238 of transferring payment. For example, in a payment transaction where the first user of the first client device is purchasing a product from the second user of the second client device, the server device(s) 206 can transfer funds from a payment account of the first user to a payment account of the second user.

In one or more embodiments, the server device(s) 206 operate in conjunction with a payment network to perform the step 238. For example, the server device(s) 206 can operate in conjunction with a payment network that comprises one or more systems operable to transfer funds between two or more financial accounts. For example, the payment network can comprise a payment processing system, a card network system, a sending banking system (associated with a payor financial account), and a receiving banking system (associated with a payee financial account).

In addition, as shown in FIG. 2B, upon transferring payment, the server device(s) 206 can also perform the steps 240, 242 of sending payment completion messages to the second client device 204 and the first client device 202. For example, the server device(s) 206 can send payment completion messages that indicate the payment transaction is complete together with details regarding the payment transaction (e.g., payment time, payment transaction ID, payment amount, products purchased, payor and/or payee).

Although FIGS. 2A-2B illustrates particular steps in a method of completing a payment transaction utilizing the digital identification system 200, it will be appreciated that the digital identification system 200 can perform additional, fewer, or alternative steps. For example, as mentioned previously, in one or more embodiments, the digital identification system 200 embeds an action identifier or other information in a digital visual code to facilitate interaction between users.

For instance, in relation to a payment transaction, the digital identification system 200 can embed information regarding the payment transaction in the digital visual code. To illustrate, in one or more embodiments, the step 208 comprises embedding an action identifier corresponding to the payment transaction in the digital visual code. Specifically, in relation to the step 208, the server device(s) 206 can receive a request from the first client device 202 for a digital visual code for initiating a payment transaction. The server device(s) 206 can generate a binary code corresponding to an identifier of an account associated with the first user and also corresponding to an action identifier for initiating a payment transaction from the first user of the first client device 202. The binary code can also include additional information regarding the payment transaction, such as a payment amount, a product, and/or a coupon.

By embedding a payment transaction action identifier in a digital visual code, the digital identification system 200 can further streamline the process of completing a payment transaction. For example, at the steps, 216, 218, the second client device 204 can scan the digital visual code and determine the payment transaction identifier (and/or other information, such as a coupon) embedded in the digital visual code. The second client device 204 can perform the step 220 and send the payment transaction identifier to the server device(s) 206. The server device(s) 206 can then omit the step 230 of receiving a separate payment request (and the second client device 204 need not provide payment transaction information). Rather, upon receiving the payment transaction identifier, the server device(s) 206 can automatically request payment confirmation (e.g., verification credentials) from the first client device 202.

In one or more embodiments, the digital identification system 200 further streamlines the method of completing a payment transaction by utilizing a verified digital visual code. A verified digital visual code is a digital visual code that provides privileges without additional confirmation or verification. In particular, a verified digital visual code includes a digital visual code that automatically provides privileges to the second client device 204 upon scanning the digital visual code from the first client device 202.

For example, in relation to FIGS. 2A-2B, the digital identification system 200 can generate a verified digital visual code at the step 208. For example, the digital identification system 200 can embed a unique indicator in digital visual code points to indicate a verified digital visual code. The second client device 204 can identify a verified digital visual code at the step 218 and send an indication of the verified digital visual code to the server device(s) 206. Upon receiving an indication of the verified digital visual code, the server device(s) 206 can automatically perform the step 238 of transferring payment (i.e., without sending a payment confirmation request at step 232, or receiving a payment confirmation from the first client device 202 at steps 234, 236).

In this manner, verified digital visual codes can further streamline completing payment transactions between users. Indeed, from the perspective of the first user of the first client device and the second user of the second client device 204, upon scanning the verified digital visual code via the second client device 204, the payment transaction is automatically completed.

In one or more embodiments, the digital identification system 200 includes additional security measures in relation to verified digital visual codes to ensure that they are not abused (e.g., scanned and improperly utilized to transfer payment without the first user's authorization). For example, in one or more embodiments, the digital identification system 200 generates verified digital visual code that are only authorized for a single-use. In other words, the digital identification system 200 via the server device(s) 206 will only provide privileges a single time upon receiving the verified digital visual code.

For instance, in one or more embodiments, after receiving a verified digital visual code, the digital identification system 200 de-activates the verified digital visual code so that it will no longer provide privileges. More specifically, in one or more embodiments, the server device(s) 206 maintain a database of digital visual codes and corresponding user accounts, activities, or other information. Upon receiving a verified digital visual code, the digital identification system 200 can modify the database of digital visual codes such that the verified digital visual code is no longer associated with a user account, activities, or other information. Thus, if a third client device obtains an image of the verified digital visual code (after the second client device utilized the verified digital visual code), the third client device could not obtain any privileges from the verified digital visual code.

In addition to single-use modification of a digital visual code database, in one or more embodiments, the digital visual code utilizes additional security measures in relation to verified digital visual codes. For example, prior to generating (or displaying) a digital visual code, in one or more embodiments, the digital identification system 200 requires the first client device 202 to provide verification credentials (e.g., a password, passcode, or fingerprint). In this manner, the digital identification system 200 can ensure that an unauthorized user of the first client device cannot generate or utilize a verified digital visual code.

To further ensure that verified digital visual codes are not erroneously captured and utilized by a third party, the digital identification system 200 can also require a unique user interaction with the first client device 202 to display the verified digital visual code. For example, the digital identification system 200 can require that the first user of the first client device 202 interact with a touchscreen in a particular manner (e.g., two-finger swipe, three-finger tap, double touch in opposite extremes of a touchscreen) to avoid accidentally or prematurely displaying a verified digital visual code.

In addition to enabling users to complete a payment transaction utilizing digital visual codes, in one or more embodiments, the digital identification system 200 also makes it easier and faster to utilize computing devices to connect individual users of a networking system. For example, in embodiments that are implemented in conjunction with a social networking system, the digital identification system 200 can facilitate sending friend requests and providing information between a first and second user of the social networking system.

For instance, FIG. 2C illustrates the digital identification system 200 performing additional steps (via the first client device 202, the second client device 204, and the server device(s) 206) in a method of connecting users of a social networking system utilizing a digital visual code. In particular, the second client device 204 can perform the step 248 of sending a friend request to the server device(s) 206. Moreover, as shown, the server device(s) 206 can perform the step 250 of sending a friend confirmation request to the first client device 202. For example, the server device(s) 206 can send a notification to the first client device 202 indicating that the second user of the second client device 204 seeks to connect (i.e., add as a "friend") the first user of the first client device 202.

As shown in FIG. 2C, upon receiving the friend request, the first client device can perform the step 252 of approving the friend request. For example, the first client device 202 can provide a user interface with a message requesting approval from the first user of the first device 202 to accept the friend request of the second user of the second client device 204.

As illustrated, upon the first user of the first client device 202 approving the friend request, the first client device 202 performs the step 254 of sending a friend request confirmation to the server device(s) 206. In response, the server device(s) 206 perform the step 255 of connecting users as friends. For example, the server device(s) 206 can maintain a database of users of the networking system that have connected as friends, and the server device(s) 206 can modify the database to indicate that the first user and the second user are connected as friends, with associated privileges (e.g., allowing the second client device 204 to obtain information and interact with the first user, view social media posts by the first user, view social media comments by the first user, view contact information of the first user, or view other information stored in an account associated with the first user).

Moreover, as shown in FIG. 2C, the digital identification system 200 can also perform the steps 256, 258 of sending friend confirmation messages to the first client device 202 and the second client device 204.

As discussed above, in one or more embodiments, the digital identification system 200 can embed action identifiers in the digital identification system 200. In relation to FIGS. 2A, 2C, the digital identification system 200 can embed an action identifier corresponding to a friend request. Accordingly, at the step 218 the second client device 204 can determine the action identifier corresponding to the friend request and send the action identifier to the server device(s) 206. Upon receiving the action identifier, the server device(s) 206 can automatically send the friend confirmation request (at the step 250, without the step 248). In this manner, the digital identification system 200 can further streamline connecting users of a networking system utilizing digital visual codes.

As mentioned above, in one or more embodiments, the digital identification system 200 can further facilitate connecting users of a networking system by providing a verified digital visual code. In particular, in one or more embodiments, the digital identification system 200 provides a verified digital visual code that avoids the needs for confirmation and/or approval from the first client device 202. For example, in relation to FIGS. 2A, 2C, the digital identification system 200 can generate a verified digital visual code (at the step 208). Upon receiving an indication of the verified digital visual code (at the step 220), the server device(s) 206 can automatically connect the first user and the second user as friends (at step 255). Thus, the digital identification system 200 can avoid steps 248, 250, 252, and 254 by utilizing a verified digital visual code.

Similar to FIGS. 2B, 2C, the digital identification system 200 can also enable a variety of additional privileges. For example, upon receiving an identifier based on a digital visual code the digital identification system 200 can initiate a messaging thread between the first user of the first client device 202 and the second user of the second client device 204. As described above, the digital identification system 200 can embed messaging action indicators in digital visual codes and/or generate verified digital visual codes with messaging action indicators to automatically initiate a message thread upon scanning a digital visual code.

Similarly, upon receiving a digital visual code, the digital identification system 200 can also add or invite users to a digital event. For example, upon receiving an identifier from the second client device 204, the server device(s) 206 can add (or invite) the second user of the second client device 204 to an event associated with the first user of the first client device 202. As described above, the digital identification system 200 can embed digital event action indicators in digital visual codes and/or generate verified digital visual codes to automatically add (or invite) a user to a digital event upon scanning a digital visual code.

Although FIGS. 2A-2C describe digital visual codes in relation to a first user and a second user, it will be appreciated that the digital identification system 200 can also generate and utilize digital visual codes corresponding to a group or a plurality of users. For example, the digital identification system 200 can generate a digital visual code that embeds an identifier corresponding to a defined group on a social networking system, and thus facilitate payment transactions, connections, events, messages, or other interaction with the group.

Similarly, the digital identification system 200 can generate a digital visual code that embeds one or more identifiers corresponding to a plurality of users. For example, a plurality of individuals meeting a new friend for the first time can utilize the digital identification system 200 to generate a digital visual code that embeds identifiers corresponding to the plurality of individuals. The new friend can scan the digital visual code to identify and interact with the plurality of individuals from the single digital visual code. For example, the new friend can scan the digital visual code and automatically begin a message thread with the plurality of individuals, initiate a payment transaction with the plurality of individuals, connect with the plurality of individuals, call the plurality of individuals, or plan digital events with the plurality of individuals.

Similarly, a plurality of users at a restaurant can utilize the digital identification system 200 to generate a digital visual code with an identifier corresponding to the plurality of users. A representative of the restaurant can utilize a mobile device to scan the digital visual code and enter into a payment transaction with the plurality of users (e.g., payment for a meal).

In addition, in one or more embodiments, the digital identification system 200 can also refresh, update, and/or modify digital visual codes. Indeed, as discussed previously in relation to verified digital visual codes, the digital identification system 200 can maintain a database of digital visual codes (e.g., identifiers) and corresponding users, groups, actions, and/or information. The digital identification system 200 can refresh, update, and/or modify the database and generate refreshed, updated, and/or modified digital visual codes.

For example, in one or more embodiments, the digital identification system 200 modifies digital visual codes after the digital visual code has been utilized a certain number of times (e.g., one time or five times). Similarly, the digital identification system 200 can modify digital visual codes after a certain period of time (e.g., one day, one week, or one month). The digital identification system 200 can send modified digital visual codes to a client device and then utilize the modified digital visual codes to provide privileges to one or more computing devices.

Turning now to FIGS. 3A-3E additional detail will be provided regarding a user interface for generating and utilizing digital visual codes in accordance with one or more embodiments. Indeed, as mentioned above, in one or more embodiments, the digital identification system 200 is implemented in conjunction with a networking application (such as a digital communication application and/or social networking application) that provides a user interface for displaying and/or scanning digital visual codes in addition to identifying and interacting with other users.

Figure 3B:
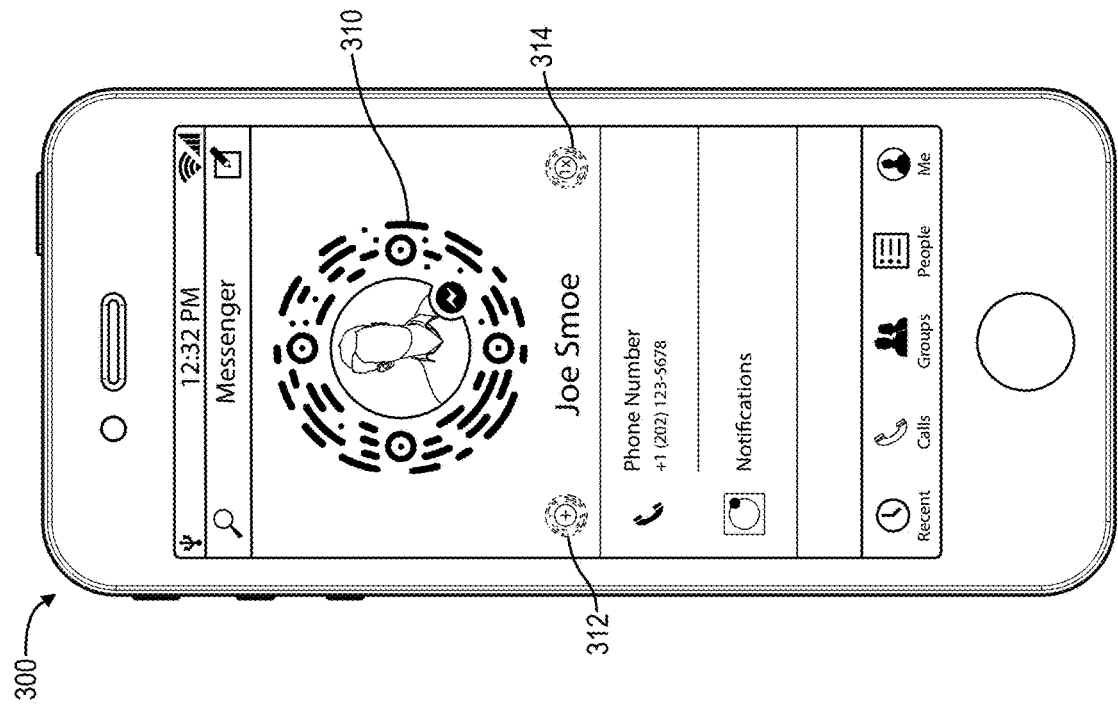
FIGS. 3A-3E illustrate a user interface of a computing device for displaying and scanning digital visual codes in accordance with one or more embodiments.
Figure 3A:
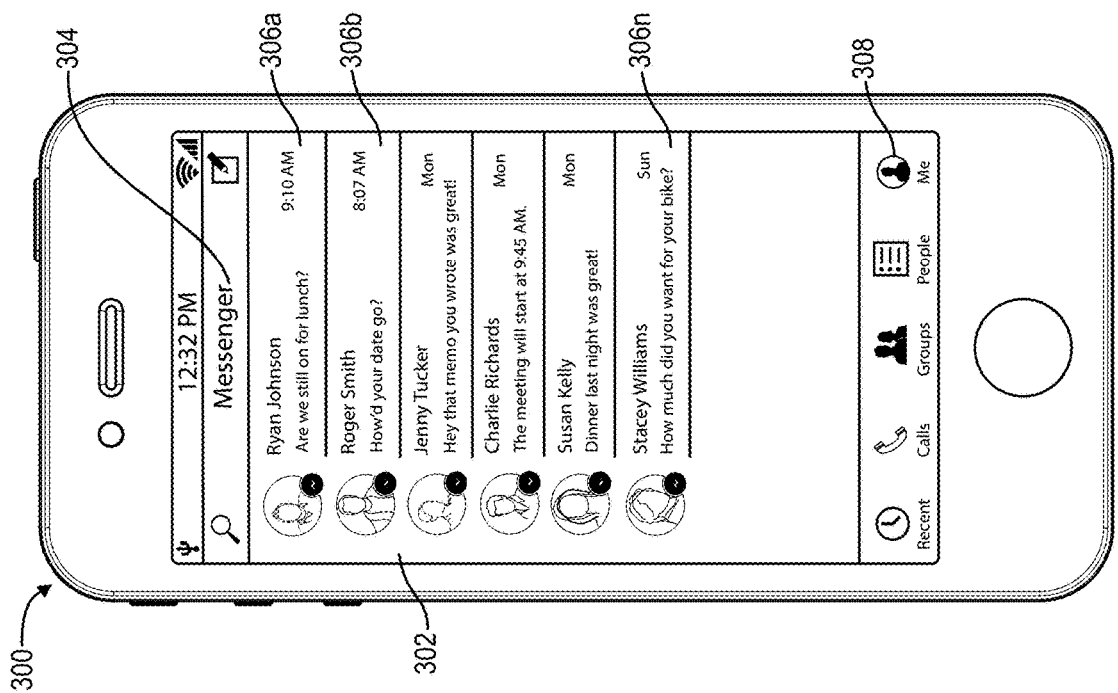

In particular, FIG. 3A illustrates a first computing device 300 displaying a user interface 302 corresponding to a digital communication application 304 (e.g., the FACEBOOK® MESSENGER® software application) in accordance with one or more embodiments of the digital identification system 200.

Specifically, as shown in FIG. 3A, the user interface 302 comprises a plurality of communication threads 306a-306n. Upon user interaction with one of the plurality of communication threads 306a-306n (e.g., a touch gesture) the digital identification system 200 can modify the user interface 302 to display one or more communications corresponding to a particular communication thread. Moreover, the digital identification system 200 can modify the user interface 302 to enable a user to draft, send, review, and/or receive additional electronic communications.

The digital identification system 200 can modify the user interface 302 to display a digital visual code. In particular, FIG. 3A illustrates a user information element 308. Upon user interaction with the user information element 308, the user interface 302 provides a digital visual code corresponding to the user. For example, FIG. 3B illustrates a digital visual code 310 upon user interaction with user information element 308.

With regard to the embodiment of FIG. 3B, the first computing device 300 receives the digital visual code 310 from a remote server. In particular, as described above, the remote server generates the digital visual code based on an identifier of the user ("Joe Smoe") in relation to a social networking system.

Although a remote server generates the digital visual code in relation to FIG. 3B, in one or more embodiments, the first computing device 300 generates the digital visual code 310. For example, the first computing device 300 can install a software application capable of generating digital visual codes of a particular format based on an identifier corresponding to the user. The first computing device 300 can access the identifier corresponding to the user and generate the digital visual code based on the identifier.

As shown in FIG. 3B, in addition to the digital visual code 310, the user interface 302 also includes an action-specific digital visual code element 312. Upon user interaction with the action-specific digital visual code element 312, the digital identification system 200 can generate a digital visual code that embeds an action identifier.

For example, in one or more embodiments, upon user interaction with the action-specific digital visual code element 312, the digital identification system 200 provides a plurality of selectable elements that correspond to particular actions. For example, the user interface 302 can provide a selectable element for initiating a payment transaction, a selectable element for sending contact information, a selectable element for adding a friend, a selectable element for inviting a contact to an event, or other actions described herein. The digital information system can also obtain (e.g., based on user input) additional information corresponding to the particular action, such as a payment amount or event details. Upon selection of a particular action and user input of information corresponding to the action, the digital identification system 200 (either at the first computing device 300 or via a remote server) can generate a new digital visual code corresponding to the particular action and/or information. In this manner, the digital information system can generate digital visual codes specific to particular actions.

Furthermore, as shown in FIG. 3B, the user interface 302 also includes a verified digital visual code element 314 (e.g., an element to generate a one-time use digital visual code). In particular, in one or more embodiments, upon user interaction with the verified digital visual code element 314, the digital identification system 200 provides a user interface for providing verification credentials (e.g., a username, code, or password). Moreover, in one or more embodiments, the digital identification system 200 then provides a user interface for selection of a particular action (e.g., initiate a payment or another action) and/or additional information (e.g., payment amount or other information). In response, the digital identification system 200 can generate (either at the first computing device 300 or a remote server) a verified digital visual code. As describe above, in one or more embodiments, the verified digital visual code is only valid for a single use. Furthermore, in one or more embodiments of the digital identification system 200, the verified digital visual code allows a user to avoid subsequent confirmation, approval, or authentication after scanning the verified digital visual code.

Figure 3D:
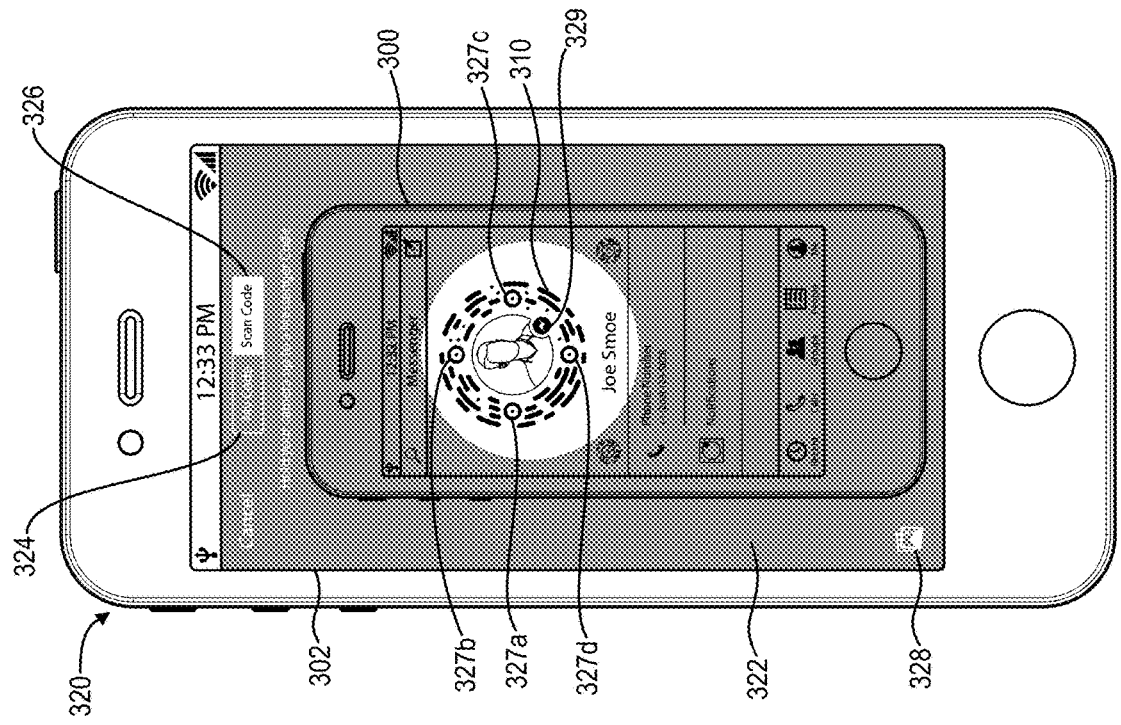
Figure 3C:
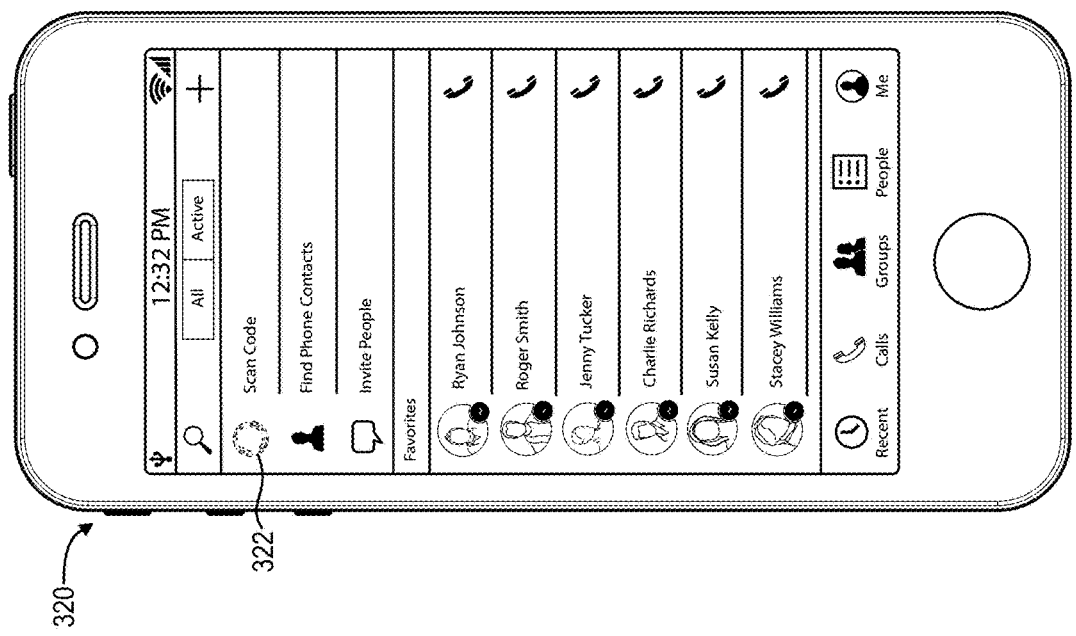
Figure 3E:
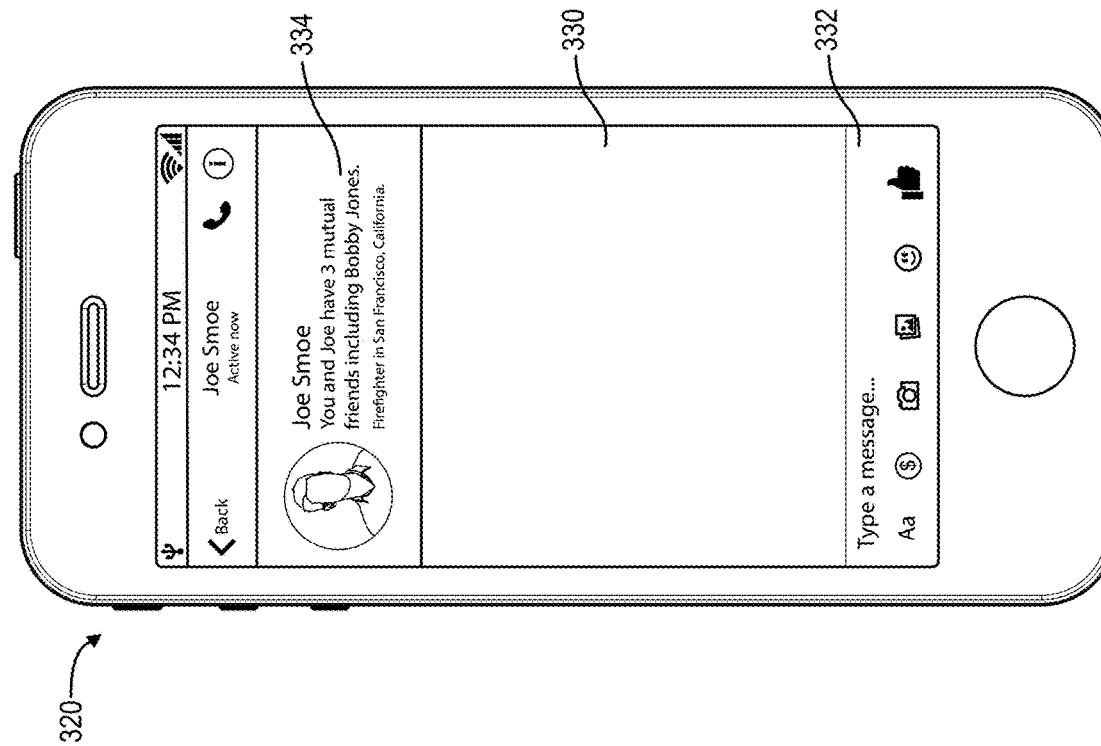

As mentioned previously, in one or more embodiments, the digital identification system 200 grants privileges to a second computing device based on the second computing device scanning a digital visual code. FIGS. 3C-3E illustrate scanning a digital visual code by a second client device and obtaining privileges in accordance with one or more embodiments. In particular, FIG. 3C illustrates a second computing device 320 of a second user displaying the user interface 302 corresponding to the digital communication application 304. As shown in FIG. 3C, the user interface 302 (upon selection of the "people" element) displays a plurality of options for identifying other users together with a plurality of contacts corresponding to the second user (e.g., friends of the second user in relation to a social networking system). Specifically, the user interface 302 displays a selectable scan code element 326. Upon user interaction with the scan code element 326, the user interface 302 provides tools for scanning a digital visual code.

For example, FIG. 3D illustrates a user interface for scanning digital visual codes according to one or more embodiments. In particular, FIG. 3D illustrates the second computing device 320 upon selection of the scan code element 326. Specifically, the user interface 302 of FIG. 3D includes an image feed 322 from an imaging device (i.e., a scanning device) operatively coupled to the second computing device 320. In particular, the image feed 322 displays sequential images captured by the imaging device in real time.

As shown, the second user of the second computing device 320 can utilize the image feed 322 to arrange the imaging device to scan the digital visual code 310. Indeed, in FIG. 3D, the image feed 322 shows that the imaging device of the computing device 320 is aimed at the digital visual code 310 displayed on the first computing device 300. Accordingly, the imaging device affixed to the computing device 320 scans the digital visual code 310. In particular, the computing device 320 scans the digital visual code 310 and determines an identifier embedded in the digital visual code 310.

As described above, in one or more embodiments, the digital identification system 200 utilizes the second computing device 320 to scan and decode the digital visual code 310 based on the anchor points 327a-327d and the orientation anchor 329. Indeed, it will be appreciated that in capturing the digital visual code 310, the second computing device 320 can be rotated at a variety of angles relative to the second computing device 320. Accordingly, the digital visual code 310 may be rotated and/or distorted, interfering with the ability of the digital information system to decode the digital visual code.

In relation to the embodiment of FIG. 3D the digital identification system 200 utilizes the orientation anchor 329 to properly orient the digital visual code. In particular, the digital identification system 200 compares the rotation/orientation of the orientation anchor 329 with an image of the orientation anchor at a standard orientation stored on the second computing device 320. The digital identification system 200 can then properly orient the remainder of the digital visual code based on the orientation of the orientation anchor 329.

Similarly, with regard to FIG. 3D, the digital identification system 200 also utilizes the anchor points 327a-327d to decode the digital visual code 310. In particular, the digital identification system 200 identifies the location of digital visual code points (e.g., affirmatively marked digital visual code points and unmarked digital visual code points) in relation to the anchor points. Accordingly, the anchor points 327a-327d provide a reference for identifying the relative location of the digital visual code points, and determining what digital visual code points are marked and/or unmarked.

Based on which digital visual code points are marked or unmarked, the second computing device 320 can decode an identifier. For example, the digital identification system 200 can determine a binary code from the digital visual code points (e.g., generating a binary code of "0" and "1" bits based on whether corresponding digital visual code points are marked or unmarked). Moreover, the digital identification system 200 can convert the binary code to a hash, user ID, and/or username. In this manner, the digital identification system 200 can determine an identifier from a digital visual code.

In addition to the image feed 322, the user interface 302 of FIG. 3D also comprises a selectable user code element 324 and a selectable scan code element 326. As shown, the selectable scan code element 326 is currently activated, thus the user interface 302 displays the camera feed and the first computing device 300 searches for a digital visual code to scan. Upon user interaction with the user code element 324, the user interface 302 can also display a digital visual code corresponding to the second user.

Furthermore, as illustrated in FIG. 3D, the user interface 302 also includes the camera roll element 328. Upon user interaction with the camera roll element 328, the digital communication application 304 can access a repository of digital media items stored on the second computing device 320 and identify digital visual codes in the repository of digital media items. For example, if the second user utilizes the computing device to capture a digital image or digital video comprising a digital visual code, the digital identification system 200 can access the digital image or digital video from the repository of digital media items and determine an identifier.

As discussed above, upon scanning a digital visual code (and sending an identifier embedded in the digital visual code to a remote server), in one or more embodiments, the digital identification system 200 provides one or more privileges to a client device (and/or a user of a client device). For instance, the digital identification system 200 can provide information corresponding to an account of another user and/or begin a message thread between users. For example, FIG. 3E shows the second computing device 320 upon scanning the digital visual code 310 from the first computing device 300.

In particular, FIG. 3E illustrates the user interface 302 upon the second computing device 320 obtaining privileges to initiate electronic communications with the user of the first computing device 300 and access information from an account of the first user of the first computing device 300. Specifically, the user interface 302 comprises a message thread area 330 and a message composition area 332. Upon user interaction with the message composition area 332, the second user of the second computing device 320 can compose and send a message to the user of the first computing device 300, which will appear in the message thread area 330.

Moreover, the user interface 302 contains a user identification element 334. The user identification element 334 provides information from an account of the user of the first computing device 300 to the second user of the second computing device 320. Indeed, as shown, the user identification element 334 indicates a number of mutual connections (e.g., common "friends" on a social networking system), an occupation, and a location corresponding to the first user of the first computing device 300.

Upon user interaction with the user identification element 334, the second computing device 320 can obtain and provide additional information corresponding to the user of the first computing device 300. Moreover, the second computing device 320 can provide options for further interactions with the user of the first computing device.

Although FIG. 3E illustrates the user interface 302 with elements for composing and displaying messages, it will be appreciated that the digital identification system 200 can provide a variety of other privileges upon scanning a digital visual element. For example, rather than providing a user interface for initiate a message thread, upon scanning the digital visual code 310, the second computing device 320 can generate a user interface for initiating a payment transaction with the user of the first computing device 300, connecting with the user of the first computing device 300, or scheduling events with the user of the first computing device 300.

Although FIGS. 3A-3E illustrate displaying a digital visual code on a computing device, in one or more embodiments, the digital visual code can also be displayed without a computing device. For example, in one or more embodiments, the digital identification system 200 generates a digital visual code that is affixed to a real-world item (e.g., a piece of art, a car, an advertisement, or a product). For example, a first user can print a digital visual code and place the digital visual code on a product for sale. A second user can scan the digital visual code placed on the product and utilize the digital identification system 200 to identify and interact with the first user (e.g., via a social networking system).

Similarly, an artist can create a page on a social networking system that contains articles regarding the artist's work. The artist can affix a digital visual code to a piece of art work. A user can then scan the digital visual code and obtain information regarding the artist's work.

Furthermore, although FIGS. 1A-1E and 3A-3E illustrate a particular branding associated with the digital visual codes, it will be appreciated that the digital identification system 200 can incorporate other colors, themes, shapes, icons, and brands in generating a digital visual code. For example, in one or more embodiments, the digital identification system 200 provides a user interface that allows users to modify the appearance of their digital visual code. Indeed, as discussed above, users can select a digital media item to utilize in conjunct ion with a digital visual code. In addition, users can select a color of a digital visual code. Similarly, users can select an icon or brand to utilize as an orientation anchor. Similarly, users can select a trademark or other image to surround the digital visual code. In this manner, the digital identification system 200 enables individuals and businesses to generate unique digital visual codes that reflect a particular style, theme, or brand.

Figure 4:
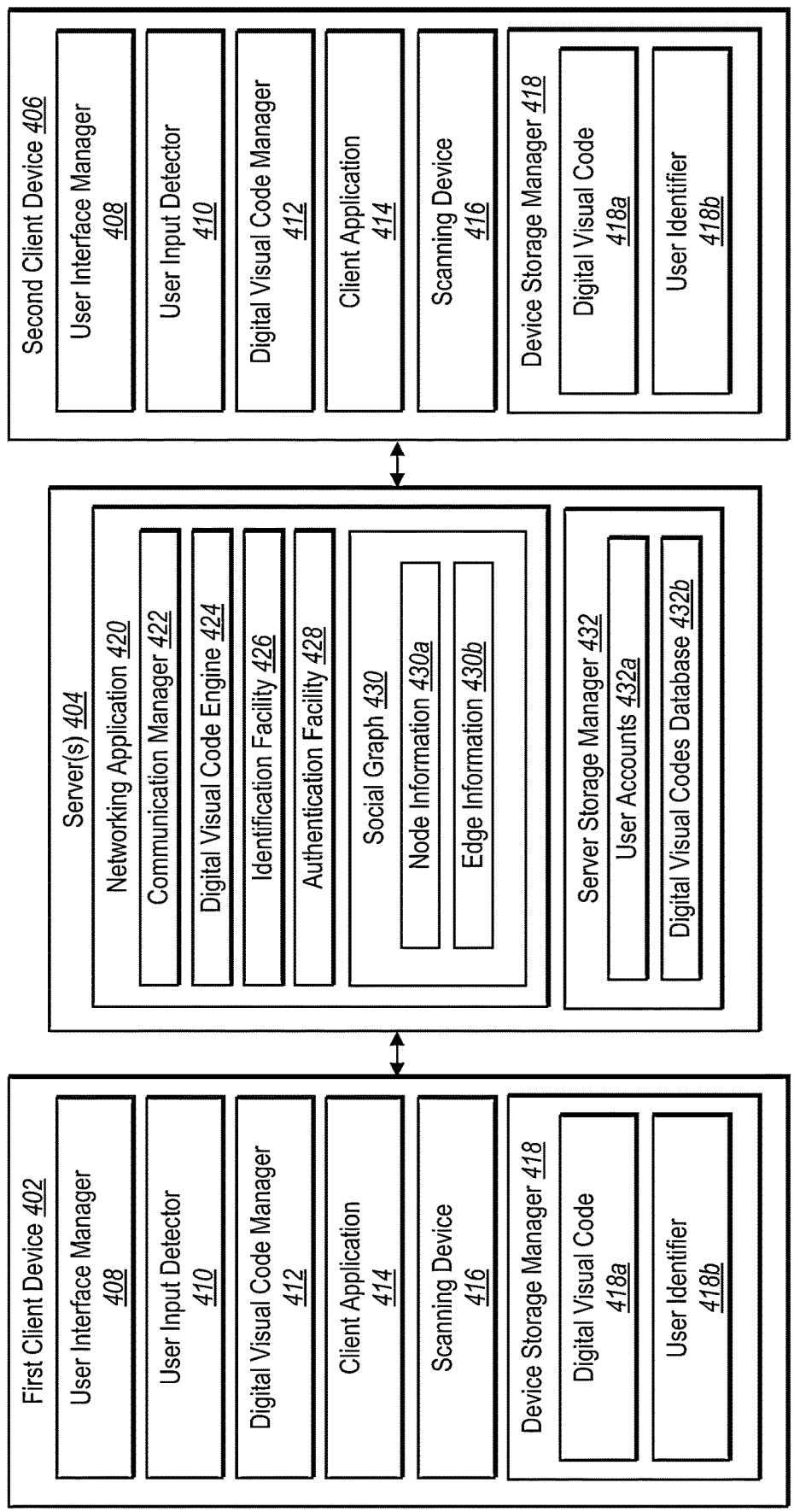
FIG. 4 illustrates a schematic diagram of a digital identification system in accordance with one or more embodiments.

Turning now to FIG. 4, additional detail will be provided regarding various components and capabilities of the digital identification system 200 in accordance with one or more embodiments. In particular, FIG. 4 illustrates an example embodiment of a digital identification system 400 (e.g., the digital identification system 200 described above) in accordance with one or more embodiments. As shown, the digital identification system 400 includes a first client device 402 (e.g., the first client device 202 or the first computing device 300), server device(s) 404 (e.g., the server device(s) 206), and a second client device 406 (e.g., the second client device 204 or the second computing device 320).

As shown, the digital identification system 400 includes various components on the first client device 402, the server device(s) 404, and the second client device 406. For example, FIG. 4 illustrates that the client devices 402, 406 each include a user interface manager 408, a user input detector 410, a digital visual code manager 412, a client application 414, a scanning device 416, and a device storage manager 418 (comprising digital visual code 418a and user identifier 418b). Furthermore, as shown, the server device(s) 404 include a networking application 420 that includes a communication manager 422, a digital visual code engine 424, an identification facility 426, an authentication facility 428, a social graph 430 (comprising node information 430a and edge information 430b) and a server storage manager 432 (comprising user accounts 432a and a digital visual code database 432b).

As mentioned, the client devices 402, 406 can include the user interface manager 408. The user interface manager 408 can provide, manage, and/or control a graphical user interface (or simply "user interface") for use with the digital identification system 400. In particular, the user interface manager 408 may facilitate presentation of information by way of an external component of the client devices 402, 406. For example, the user interface manager 408 may display a user interface by way of a display screen associated with the client devices 402, 406. The user interface may be composed of a plurality of graphical components, objects, and/or elements that allow a user to perform a function. The user interface manager 408 can present, via the client devices 402, 406, a variety of types of information, including text, images, video, audio, characters, or other information. Moreover, the user interface manager 408 can provide a variety of user interfaces specific to any variety of functions, programs, applications, plug-ins, devices, operating systems, and/or components of the client devices 402, 406 (e.g., the user interface 302).

The user interface manager 408 can provide a user interface with regard to a variety of operations or applications (e.g., the digital communication application 304 and/or the client application 414). For example, the user interface manager 408 can provide a user interface that facilitates composing, sending, or receiving an electronic communication. Similarly, the user interface manager 408 can generate a user interface that facilitates creating, modifying, searching for, and/or inviting to a digital event. Moreover, the user interface manager 408 can generate a user interface for interacting via a social networking system, such as viewing social media posts, viewing social media comments, connecting with other social networking system users, etc. Additional details with respect to various example user interface elements are described throughout with regard to various embodiments containing user interfaces.

In addition to the user interface manager 408, as shown in FIG. 4, the client devices 402, 406 also include the user input detector 410. The user input detector 410 can detect, identify, monitor, receive, process, capture, and/or record various types of user input. For example, the user input detector 410 may be configured to detect one or more user interactions with respect to a user interface. As referred to herein, a "user interaction" refers to conduct performed by a user (or a lack of conduct performed by a user) to control the function of a computing device. "User input," as used herein, refers to input data generated in response to a user interaction.

The user input detector 410 can operate in conjunction with any number of user input devices or computing devices (in isolation or in combination), including personal computers, laptops, smartphones, smart watches, tablets, touchscreen devices, televisions, personal digital assistants, mouse devices, keyboards, track pads, or stylus devices. The user input detector 410 can detect and identify various types of user interactions with user input devices, such as select events, drag events, scroll events, and so forth. For example, in the event the client devices 402, 406 includes a touch screen, the user input detector 410 can detect one or more touch gestures (e.g., swipe gestures, tap gestures, pinch gestures, or reverse pinch gestures) from a user that forms a user interaction.

Furthermore, the user input detector 410 can detect or identify user input in any form. For example, the user input detector 410 can detect a user interaction with respect to a variety of user interface elements, such as selection of a graphical button, a drag event within a graphical object, or a particular touch gesture directed to one or more graphical objects or graphical elements of a user interface. Similarly, the user input detector 410 can detect user input directly from one or more user input devices.

The user input detector 410 can communicate with, and thus detect user input with respect to, a variety of programs, applications, plug-ins, operating systems, user interfaces, or other implementations in software or hardware. For example, the user input detector 410 can recognize user input of an electronic communication and/or event details provided in conjunction with the client application 414.

As further illustrated in FIG. 4, the client devices 402, 406 include the digital visual code manager 412. The digital visual code manager 412 can create, generate, provide for display, scan, identify, decode, interpret, and/or process digital visual codes. For example, as discussed previously, the digital visual code manager 412 can process a digital visual code captured by a scanning device (e.g., the scanning device 416). In particular, the digital visual code manager 412 can process a digital visual code and identify data embedded in the digital visual code, such as an identifier of an account corresponding to a user, an action identifier, product information, product cost information, coupons, user information, user preferences, and/or other information.

As mentioned previously, the digital visual code manager 412 can also create a digital visual code. For example, the digital visual code manager 412 can receive one or more identifiers (e.g., from the digital visual code engine 424) and generate a digital visual code reflecting the one or more identifiers. The digital visual code manager 412 can also generate digital visual codes that reflect other information, such as selected products, user information, and/or coupons. The digital visual code manager 412 can also generate digital visual codes that reflect information regarding groups or multiple users.

The client devices 402, 406 also include the client application 414. In one or more embodiments, the client application 414 is a native application installed on the client devices 402, 406. For example, the client applications 414 on one or both client devices 402, 406 may be a mobile application that installs and runs on a mobile device, such as a smartphone or a tablet. Alternatively, client applications 414 may be a desktop application, widget, or other form of a native computer program that runs on a desktop device or laptop device. Alternatively, the client applications 414 may be a remote application, such as a web application executed within a web browser, that the client devices 402, 406 access.

For example, in one or more embodiments the client application 414 comprises a digital communication application (e.g., an instant messaging application, e-mail application, or texting application). Similarly, in one or more embodiments, the client application 414 comprises a social networking application.

Although the client application 414 is illustrated as an individual component of the first client device 402 and the second client device 406, it will be appreciated that in one or more embodiments, other components of the first client device 402 are implemented in conjunction with the client application 414. For example, in one or more embodiments, the user interface manager 408, the user input detector, the digital visual code manager 412, and the client application 414 are implemented as part of the client application 414.

As illustrated in FIG. 4, client devices 402, 406 also include the scanning device 416. The scanning device 416 can identify, capture, scan, and analyze one or more codes. For example, the scanning device 416 can capture a digital visual code. In particular, the scanning device 416 can scan a digital visual code provided for display via another client device. Similarly, the scanning device 416 can provide an image feed for display (e.g., via the user interface manager 408) such that users of the client devices 402, 406 can identify a digital visual code for scanning.

As shown in FIG. 4, the client devices 402, 406 also include the device storage manager 418. The device storage manager 418 maintains data for the digital identification system 400. The device storage manager 418 can maintain data of any type, size, or kind, as necessary to perform the functions of the digital identification system. As illustrated in FIG. 4, the device storage manager 418 includes digital visual code 418*a* (i.e., one or more digital visual codes utilized by the client devices 402, 406) and user identifier 418*b* (i.e., one or more user identifiers utilized by the client devices 402, 406).

As briefly mentioned above, in addition to the client devices 402, 406, the digital identification system 400 can further include a networking application 420 that is implemented in whole or in part on the server(s) 404. In one or more embodiments of the present disclosure, the networking application 420 is part of a social-networking system (such as, but not limited to FACEBOOK®), but in other embodiments the networking application 420 may comprise another type of applications, including but not limited to a digital communication application (e.g., an instant messaging application or an e-mail application), search engine application, digital event application, payment application, banking application, or any number of other application types that utilizes user accounts.

As illustrated, in one or more embodiments where the networking application 420 comprises a social networking system, the networking application 420 may include the social graph 430 for representing and analyzing a plurality of users and concepts. Node storage of the social graph 430 can store node information 430*a* comprising nodes for users, nodes for concepts, nodes for transactions, and nodes for items. Edge storage of the social graph 430 can store edge information 430*b* comprising relationships between nodes and/or actions occurring within the social-networking system. Further detail regarding social networking systems, social graphs, edges, and nodes is presented below with respect to FIGS. 9-10.

As illustrated in FIG. 4, the server(s) 404 include the communication manager 422. The communication manager 422 processes messages received from the client devices 402, 406. The communication manager 422 can act as a directory for messages or data sent to and received from users interacting via the networking application 420. For example, the communication manager 422 can act as a directory for messages or data in relation to parties to a payment transaction, in relation to participants in a message thread, in relation attendees of a digital event, or in relation to users of a social networking system.

As shown in FIG. 4, the networking application 420 also includes the digital visual code engine 424. The digital visual code engine 424 can generate, create, provide, modify, alter, change, send, and/or receive one or more digital visual codes. In particular, the digital visual code engine 424 can generate digital visual codes embedding identifiers corresponding to an account of one or more users or groups.

For example, the digital visual code engine 424 can generate a digital visual code that embeds a username corresponding to a user account (e.g., from the user accounts 432a). Moreover, the digital visual code engine 424 can send the digital visual code to the client devices 402, 406. As mentioned above, the digital visual code engine 424 can generate digital visual codes that embed a variety of other types of information, such as action identifiers, product information, coupon information, or user information.

As described above, in one or more embodiments, the digital visual code engine 424 generates a digital array comprising a plurality of digital visual code points. The digital visual code engine 424 can embed one or more identifiers in the digital array by marking digital visual code points corresponding to an identifier (e.g., mark digital visual code points to mirror bits in a binary code).

Furthermore, in one or more embodiments, the digital visual code engine 424 generates a digital array of digital visual code points arranged in concentric circles (e.g., four concentric circles) surrounding a digital media item area. Upon marking digital visual code points corresponding to one or more identifiers, the digital visual code engine 424 can connect adjacent digital visual code points. For example, the digital visual code engine 424 can connect adjacent digital visual code points in each concentric circle of the digital array with curves.

As mentioned, the digital visual code engine 424 can also modify one or more digital visual codes. For example, the digital visual code engine 424 can modify the digital visual codes database 432b to change the digital visual code corresponding to a particular user (e.g., user account), action, or information. Similarly, in one or more embodiments, the digital visual code engine 424 modifies digital visual codes by modifying identifiers utilized to create the digital visual codes (e.g., modify the identifiers stored in the user accounts 432a).

In one or more embodiments, the digital visual code engine 424 can generate a verified digital visual code. A verified digital visual code (e.g., a single-use digital visual code) can automatically perform a function upon scanning by a client device. The digital identification system 400 can utilize verified digital visual codes to streamline identification and authentication of a user and interacting between users of the digital identification system 400.

As shown in FIG. 4, the networking application 420 can also include the identification facility 426. The identification facility 426 can identify one or more users or actions. In particular, the identification facility 426 can identify an account of a user based on an identifier received from one of the client devices 402, 406. For example, the identification facility 426 can receive an identifier from the client device and identify an account corresponding to the identifier from the user accounts 432a. Similarly, the identification facility 426 can identify actions corresponding to action identifiers provided by the client devices 402, 406.

As illustrated in FIG. 4, the networking application 420 can also include the authentication facility 428. The authentication facility 428 can verify and/or authenticate one or more users and/or client devices. Moreover, the authentication facility 428 can provide one or more privileges and/or access. For example, in one or more embodiments the client devices 402, 406 provide verification credentials corresponding to a user of the client devices. The authentication facility 428 can verify the accuracy of the verification credentials.

Similarly, upon receiving an identifier and determining an account corresponding to the identifier (e.g., via the identification facility 426), the authentication facility 428 can provide one or more privileges. For example, as described above, the authentication facility 428 can provide privileges to access information from a user account (e.g., user accounts 432a), initiate payment transactions, add or invite to digital events, connect with another user (e.g., add as a friend), and/or initiate electronic communications.

The server(s) 404 can also include the server storage manager 432. The server storage manager maintains data for the digital identification system 400. The device storage manager 418 can maintain data of any type, size, or kind, as necessary to perform the functions of the digital identification system. As illustrated in FIG. 4, the device storage manager 418 includes user accounts 432a and digital visual code database 432b.

The server storage manager 432 can manage the user accounts 432a and digital visual code database 432b corresponding to a plurality of users. Specifically, when a user registers with the networking application 420 (e.g., via the client application 414), the networking application 420 (e.g., via the server storage manager 432) creates a user account for the user. The server storage manager 432 can store information about the user for maintaining and displaying in a visible user profile for the user. For example, the user accounts 432a can maintain personal information, identification information, location information, images uploaded by the user, contacts, and other information that the user provides to the networking application 420 to populate the user account.

In one or more embodiments, server storage manager 432 also associates identifiers or other information with digital visual codes and/or user accounts via the digital visual code database 432b. For example, the digital visual code database 432b can comprise one or more arrays, spreadsheets, or tables that identify a user corresponding to an identifier and/or a digital visual code. As described above, the digital identification system 400 can modify and update the digital visual code database 432b to refresh, update, and/or modify digital visual codes. Furthermore, as described, the digital identification system 400 can utilize the digital visual code database 432b to provide digital visual codes to client devices 402, 406.

Each of the components of the first client device 402, the server(s) 404, and the second client device 406 can communicate with each other using any suitable communication technologies. It will be recognized that although the components of the first client device 402, the server(s) 404, and the second client device 406 are shown to be separate in FIG. 4, any of the components may be combined into fewer components, such as into a single facility or module, or divided into more components as may serve a particular embodiment.

Moreover, while FIG. 4 describes certain components as part of the client application 414 and other components as part of the networking application 420, the present disclosure is not so limited. In alternative embodiments, one or more of the components shown as part of the client application 414 can be part of the networking application 420 or vice versa.

The components can include software, hardware, or both. For example, the components can include computer instructions stored on a non-transitory computer-readable storage medium and executable by at least one processor of the client devices 402, 406 or the server(s) 404. When executed by the at least one processor, the computer-executable instructions can cause the client devices 402, 406 or the server(s) 404 to perform the methods and processes described herein. Alternatively, the components can include hardware, such as a special purpose processing device to perform a certain function or group of functions. Moreover, the components can include a combination of computer-executable instructions and hardware.

Furthermore, the components 408-432 of the digital identification system 400 may, for example, be implemented as one or more stand-alone applications, as one or more modules of an application, as one or more plug-ins, as one or more library functions or functions that may be called by other applications, and/or as a cloud-computing model. Thus, the components 408-432 of the digital identification system 400 may be implemented as a stand-alone application, such as a desktop or mobile application. Furthermore, the components 408-432 of the digital identification system 400 may be implemented as one or more web-based applications hosted on a remote server. Moreover, the components of the digital identification system 400 may be implemented in a suit of mobile device applications or "apps."

Figure 5:
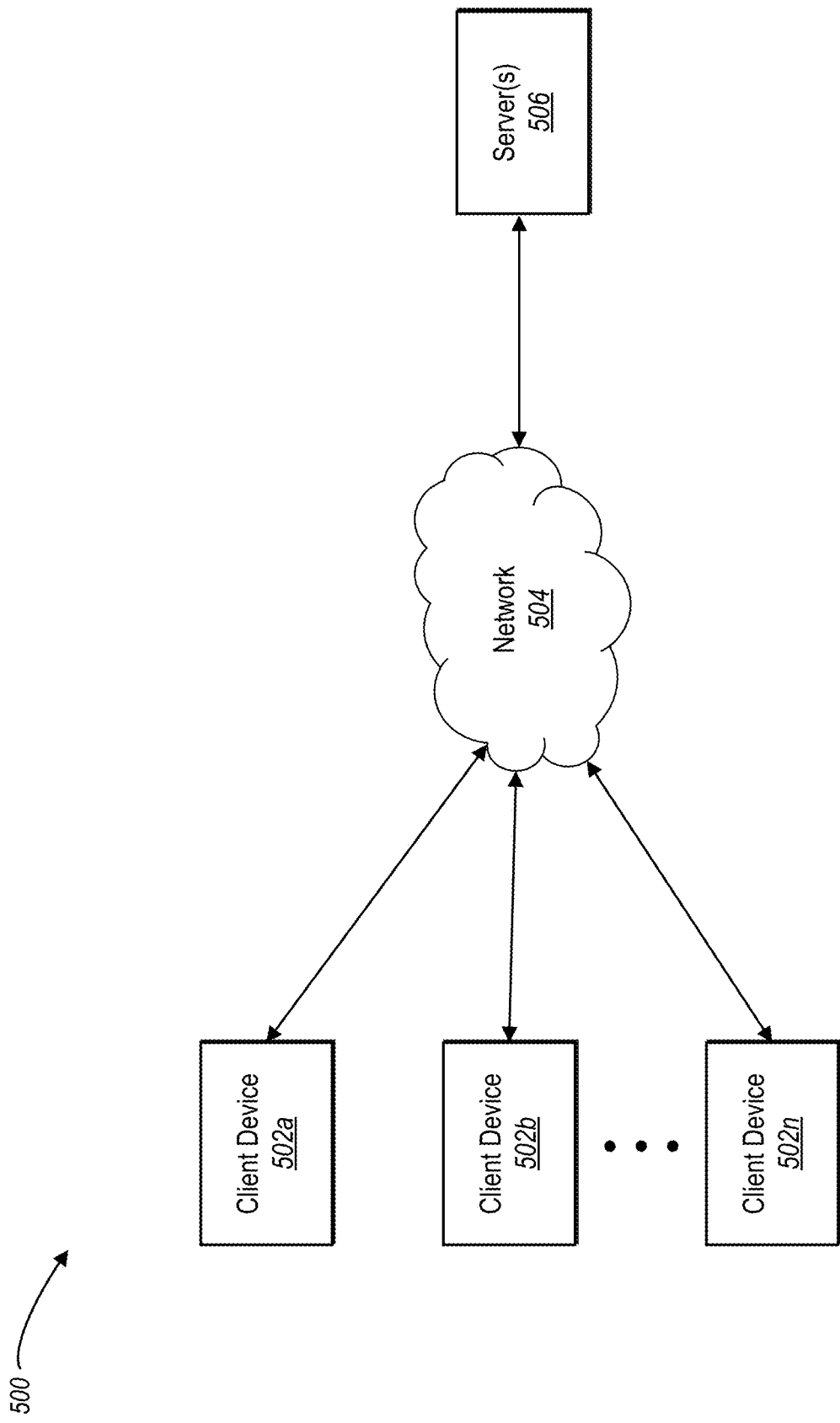
FIG. 5 illustrates a schematic diagram of a network environment in which the methods and systems disclosed herein may be implemented in accordance with one or more embodiments.

Turning now to FIG. 5, further information will be provided regarding implementation of the digital identification system 400. Specifically, FIG. 5 illustrates a schematic diagram of one embodiment of an exemplary system environment ("environment") 500 in which the digital identification system 400 can operate. As illustrated in FIG. 5, the environment 500 can include client devices 502a-502n, a network 504, and server(s) 506. The client devices 502a-502n, the network 504, and the server(s) 506 may be communicatively coupled with each other either directly or indirectly (e.g., through the network 504). The client devices 502a-502n, the network 504, and the server(s) 506 may communicate using any communication platforms and technologies suitable for transporting data and/or communication signals, including any known communication technologies, devices, media, and protocols supportive of remote data communications, examples of which will be described in more detail below.

As just mentioned, and as illustrated in FIG. 5, the environment 500 can include the client devices 502a-502n. The client devices 502a-502n (e.g., the client devices 402, 406) may comprise any type of computing device. For example, the client devices 502a-502n may comprise one or more personal computers, laptop computers, mobile devices, mobile phones, tablets, special purpose computers, TVs, or other computing devices. In one or more embodiments, the client devices 502a-502n may comprise computing devices capable of communicating with each other or the server(s) 506. The client devices 502a-502n may comprise one or more computing devices as discussed in greater detail below in relation to FIGS. 8-9.

As illustrated in FIG. 5, the client devices 502a-502n and/or the server(s) 506 may communicate via the network 504. The network 504 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 504 may be any suitable network over which the client devices 502a-502n (or other components) may access the server(s) 506 or vice versa. The network 504 will be discussed in more detail below in relation to FIGS. 8-9.

Moreover, as illustrated in FIG. 5, the environment 500 also includes the server(s) 506. The server(s) 506 (e.g., the server(s) 404) may generate, store, receive, and/or transmit any type of data. For example, the server(s) 506 may receive data from the client device 502a and send the data to the client device 502b. In one example, server(s) 506 can host a social network. In one or more embodiments, the server(s) 506 may comprise a data server. The server(s) 506 can also comprise a communication server or a web-hosting server. Regardless, the server(s) 506 can be configured to receive a wide range of electronic documents or communications, including but not limited to, text messages, instant messages, social networking messages, social networking posts, emails, tags, comments, and any other form of electronic communications or electronic documents. Additional details regarding the server(s) 506 will be discussed below in relation to FIGS. 8-9.

Although FIG. 5 illustrates three client devices 502a-502n, it will be appreciated that the client devices 502a-502n can represent any number of computing devices (fewer or greater than shown). Similarly, although FIG. 5 illustrates a particular arrangement of the client devices 502a-502n, the network 504, and the server(s) 506, various additional arrangements are possible.

In addition to the elements of the environment 500, one or more users can be associated with each of the client devices 502a-502n. For example, users may be individuals (i.e., human users). The environment 500 can include a single user or a large number of users, with each of the users interacting with the digital identification system 400 through a corresponding number of computing devices. For example, a user can interact with the client device 502a for the purpose of composing and sending an electronic communication (e.g., instant message). The user may interact with the client device 502a by way of a user interface on the client device 502a. For example, the user can utilize the user interface to cause the client device 502a to create and send an electronic communication to one or more of the plurality of users of the digital identification system 400.

By way of an additional example, in one or more embodiments the client device 502a sends (via the client application 414) a request to the server(s) 506 for a digital visual code corresponding to a particular action (e.g., inviting another user to a digital event). The server(s) 506 can determine an identifier corresponding to a user of the client device 502a and generate (e.g., via the digital visual code engine 424) a digital visual code corresponding to the identifier and the particular action. Specifically, the server(s) 506 encode an identifier and action identifier in a digital visual code with a plurality of digital visual code points arranged in concentric circles. Moreover, the server(s) 506 provide the digital visual code to the client device 502a. The client device 502a can display the digital visual code and the client device 502b can scan (e.g., via the scanning device 416) the digital visual code form the client device 502a. The client device 502b can decode (e.g., via the client application 414) the digital visual code and identify the identifier and the action identifier embedded in the digital visual code. The client device 502b can send the identifier and the action identifier to the server(s) 506. The server(s) 506 can identify (e.g., via the identification facility 426) an account and an action based on the identifier and the action identifier. In response, the server(s) 506 can provide the client device 502b with one or more privileges (e.g., via the authentication facility 428). In particular, the server(s) 506 can provide privileges that enable the second client device to perform the particular action (e.g., invite the user to the digital event). Notably, the user of the client device 502a and the user of the client device 502b need not exchange contact information or search through lists of contacts to perform the particular action or obtain privileges.

As illustrated by the previous example embodiment, the digital identification system 400 may be implemented in whole, or in part, by the individual elements 502a-506 of the environment 500. Although the previous example, described certain components of the digital identification system 400 implemented with regard to certain components of the environment 500, it will be appreciated that components of the digital identification system 400 can be implemented in any of the components of the environment 500.

Figure 6:
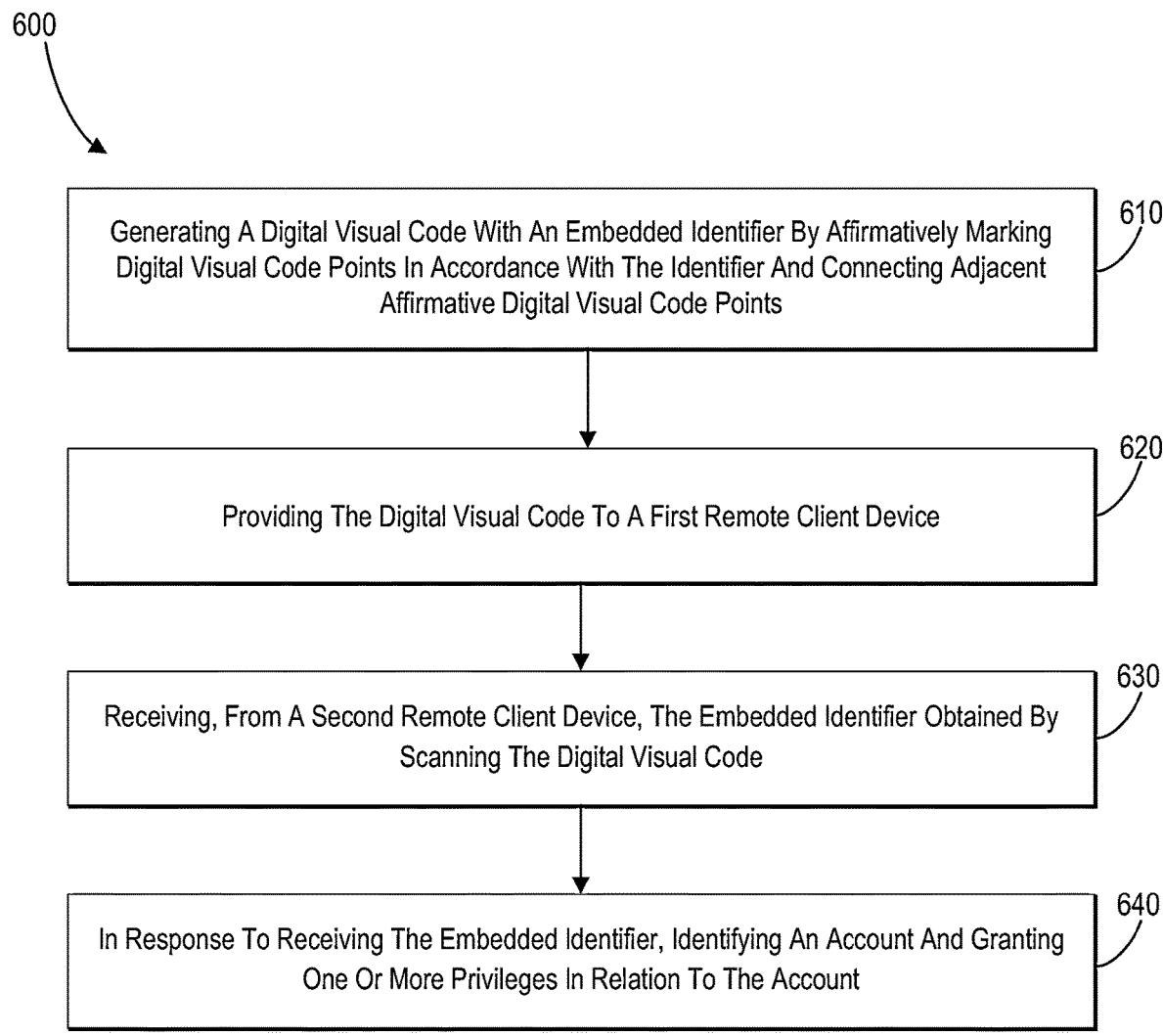
FIG. 6 illustrates a flow chart of a method of generating and utilizing a digital visual code in accordance with one or more embodiments.
Figure 7:
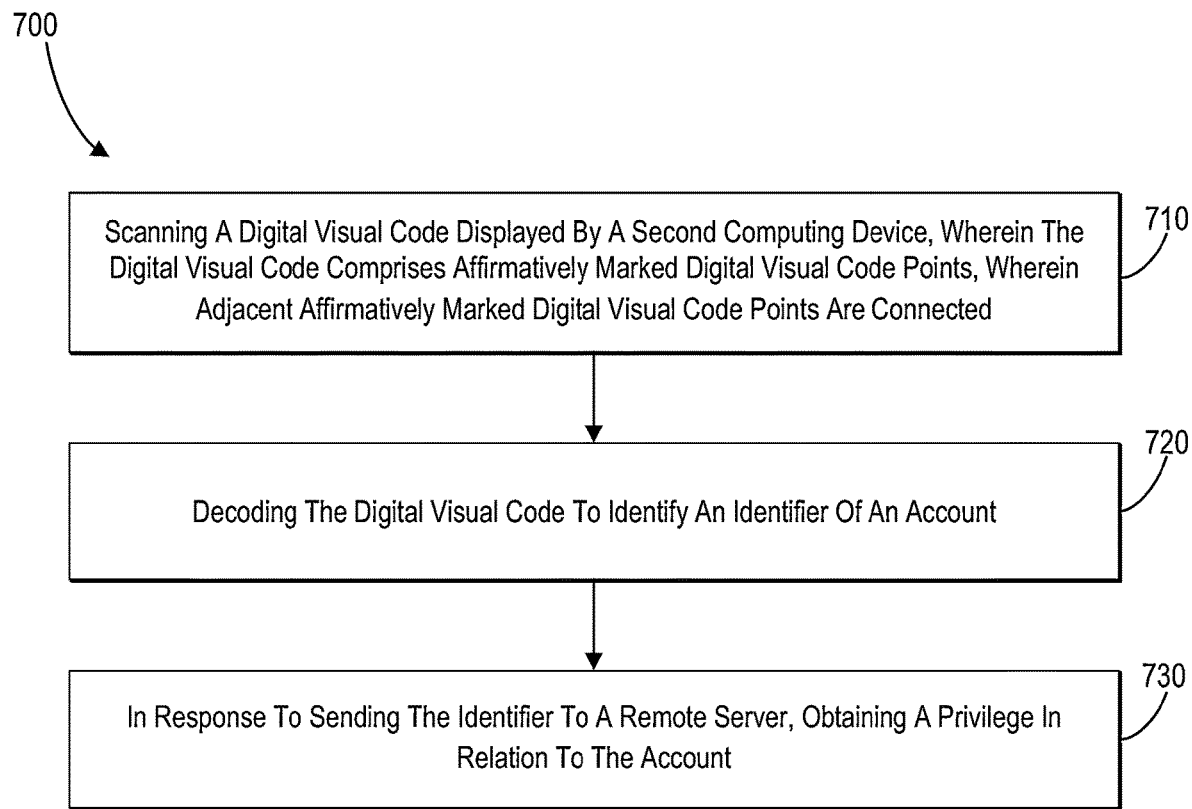
FIG. 7 illustrates another flow chart of a method of utilizing a digital visual code in accordance with one or more embodiments.

FIGS. 1A-5, the corresponding text, and the examples, provide a number of different systems and devices for generating and utilizing digital visual codes. In addition to the foregoing, embodiments can also be described in terms of flowcharts comprising acts and steps in a method for accomplishing a particular result. For example, FIGS. 6-7 illustrate flowcharts of exemplary methods in accordance with one or more embodiments of the present invention. The methods described in relation to FIGS. 6-7 may be performed with less or more steps/acts or the steps/acts may be performed in differing orders. Additionally, the steps/acts described herein may be repeated or performed in parallel with one another or in parallel with different instances of the same or similar steps/acts.

FIG. 6 illustrates a flowchart of a series of acts in a method 600 of utilizing digital visual codes in accordance with one or more embodiments of the present invention. In one or more embodiments, the method 600 is performed in a digital medium environment that includes the digital identification system 400. The method 600 is intended to be illustrative of one or more methods in accordance with the present disclosure, and is not intended to limit potential embodiments. Alternative embodiments can include additional, fewer, or different steps than those articulated in FIG. 6.

As shown in FIG. 6, the method 600 includes an act 610 of generating a digital visual code with an embedded identifier by affirmatively marking digital visual code points in accordance with the identifier and connecting adjacent affirmative digital visual code points. In particular, the act 610 can include generating, by at least one processor, a digital visual code by embedding an identifier of an account of a first user with a networking system into a digital array comprising a plurality of digital visual code points and one or more anchor points by affirmatively marking digital visual code points from the plurality of digital visual code points in accordance with the identifier of the first user and connecting adjacent affirmative digital visual code points. For example, in one or more embodiments, the act 610 comprises generating the digital visual code points in a plurality of concentric circles. Moreover, in one or more embodiments, the act 610 comprises generating the digital visual array such that the plurality of concentric circles surrounds a digital media item corresponding to the first user. For instance, in one or more embodiments, the digital media item comprises a profile picture (or digital video).

Furthermore, in one or more embodiments, the act 610 includes generating at least three anchor points and an orientation anchor. In addition, the step 610 can further include connecting adjacent affirmative digital visual code points within each of the concentric circles in the digital array with a curve.

Moreover, the step 610 can further comprise: identifying a user ID corresponding to the account of the first user; generating a hash based on the user ID corresponding to the account of the first user; transforming the hash to a binary code comprising a plurality of bits; and affirmatively marking the digital visual code points based on the bits of the binary code.

In addition, as illustrated in FIG. 6, the method 600 also includes an act 620 of providing the digital visual code to a first remote client device. In particular, the act 620 can include providing the digital visual code to a first remote client device of the first user.

As illustrated in FIG. 6, the method 600 also includes an act 630 of receiving, from a second remote client device, the embedded identifier obtained by scanning the digital visual code. In particular, the act 630 can include receiving, from a second remote client device of a second user, the identifier of the first user obtained by scanning and decoding the digital visual code. In one or more embodiments, the act 630 includes receiving, from the second remote client device, a hash corresponding to the account of the first user.

As shown in FIG. 6, the method 600 also includes an act 640 of, in response to receiving the embedded identifier, identifying an account and granting one or more privileges in relation to the account. In particular, the act 640 can include, in response to receiving the identifier from the second remote client device of the second user, identifying the account of the first user with the networking system; and granting one or more privileges to the second remote client device of the second user in relation to the account of the first user with the networking system. For example, in one or more embodiments, granting the one or more privileges comprises: providing information from the account of the first user; initiating a payment transaction between the first user and the second user; initiating an electronic communication between the first user and the second user; or sending an invitation for an event corresponding to the first user to the second user.

In addition, in one or more embodiments, the method 600 also includes embedding an action identifier corresponding to one or more actions into the digital visual code by marking additional digital visual code points in accordance with the action identifier; and receiving the action identifier from the second device. Further, the method 600 can also include marking additional digital visual code points corresponding to the action identifier, wherein the one or more actions comprise at least one of: initiating a payment transaction between the first user and the second user, initiating an electronic communication between the first user and the second user, or sending an invitation for an event. Moreover, granting the one or more privileges to the second remote client device of the second user (from step 640) can further include permitting the second remote client device to perform the one or more actions.

In addition, FIG. 7 illustrates a flowchart in another series of acts in a method 700 of utilizing digital visual codes. As shown in FIG. 7, the method 700 includes an act 710 of scanning a digital visual code displayed by a second computing device, wherein the digital visual code comprises affirmatively marked digital visual code points, wherein adjacent affirmatively marked digital visual code points are connected. In particular, the act 710 can include scanning, by a first computing device of a first user, a digital visual code displayed by a second computing device of a second user, wherein the digital visual code comprises a plurality of affirmatively marked digital visual code points and one or more anchor points, wherein adjacent affirmatively marked digital visual code points from the plurality of affirmatively marked digital visual code points are connected. For example, in one or more embodiments, the one or more anchor points comprise: at least three anchor points and an orientation anchor, wherein the orientation anchor comprises a brand image.

As illustrated in FIG. 7, the method 700 also includes an act 720 of decoding the digital visual code to identify an identifier of an account. In particular, the act 720 can include decoding the digital visual code to identify an identifier of an account of the second user of the second computing device in relation to a networking system based on the one or more anchor points and the affirmatively marked digital visual code points. For example, in one or more embodiments, the act 720 includes capturing an image of the digital visual code; and orienting the digital visual code within the image based on the at least three anchor points and the orientation anchor. Moreover, the act 720 can also include generating a binary code corresponding to the affirmatively marked digital visual code points; and generating the identifier from the binary code.

In addition, as illustrated in FIG. 7, the method 700 also includes an act 730 of, in response to sending the identifier to a remote server, obtaining a privilege in relation to the account. In particular, the act 730 can include, in response to sending the identifier to a remote server, obtaining a privilege in relation to the account of the second user and the networking system. For example, in one or more embodiments, the act 730 includes obtaining information from the account of the second user; initiating a payment transaction between the first user and the second user, initiating an electronic communication between the first user and the second user, or sending an invitation for an event corresponding to the second user.

Further, in one or more embodiments, the method 700 includes identifying an action identifier corresponding to an action embedded in the digital visual code; and sending the action identifier embedded in the digital visual code to the remote server. In addition, in one or more embodiments, obtaining the privilege in relation to the account of the second user and the networking system comprises performing the action corresponding to the action identifier.

Figure 8:
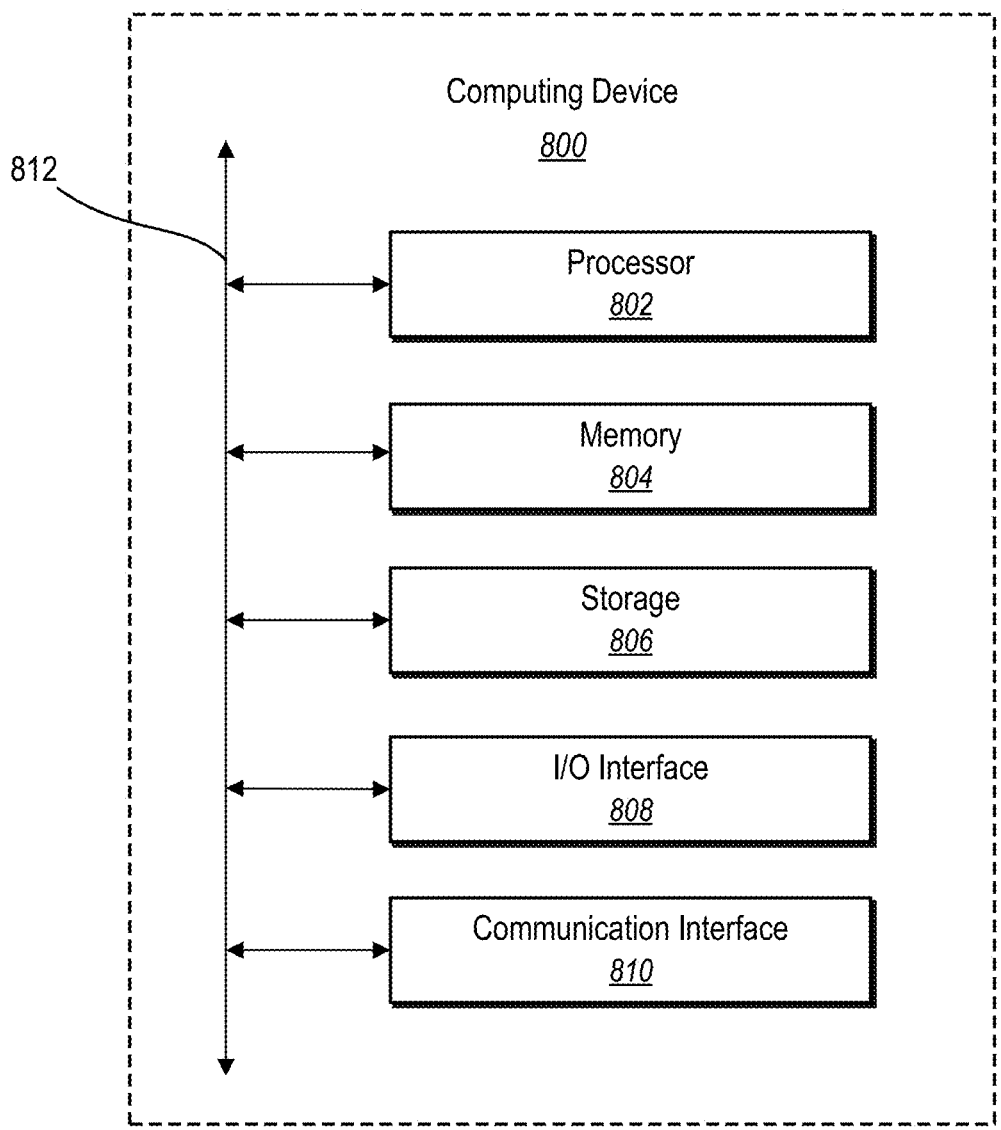
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that the first client device 202, the second client device 204, the server device(s) 206, the first computing device 300, the second computing device 320, the first client device 402, the server(s) 404, the second client device 406, the client devices 502a-502n, and the server(s) 506 each comprise one or more computing devices in accordance with implementations of computing device 800. As shown by FIG. 8, the computing device can comprise a processor 802, a memory 804, a storage device 806, an I/O interface 808, and a communication interface 810, which may be communicatively coupled by way of communication infrastructure 812. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage device 806 and decode and execute them. In particular embodiments, processor 802 may include one or more internal caches for data, instructions, or addresses. As an example and not by way of limitation, processor 802 may include one or more instruction caches, one or more data caches, and one or more translation lookaside buffers (TLBs). Instructions in the instruction caches may be copies of instructions in memory 804 or storage 806.

Memory 804 may be used for storing data, metadata, and programs for execution by the processor(s). Memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 804 may be internal or distributed memory.

Storage device 806 includes storage for storing data or instructions. As an example and not by way of limitation, storage device 806 can comprise a non-transitory storage medium described above. Storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In other embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 808 allows a user to provide input to, receive output from, and otherwise transfer data to and receive data from computing device 800. I/O interface 808 may include a mouse, a keypad or a keyboard, a touch screen, a camera, an optical scanner, network interface, modem, other known I/O devices or a combination of such I/O interfaces. I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 808 is configured to provide graphical data to a display for presentation to a user. The graphical data may be representative of one or more graphical user interfaces and/or any other graphical content as may serve a particular implementation.

Communication interface 810 can include hardware, software, or both. In any event, communication interface 810 can provide one or more interfaces for communication (such as, for example, packet-based communication) between computing device 800 and one or more other computing devices or networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 810 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 810 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 812 may include hardware, software, or both that couples components of computing device 800 to each other. As an example and not by way of limitation, communication infrastructure 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, digital identification system 400 may be linked to and/or implemented within a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g. wall posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multimedia files to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 9:
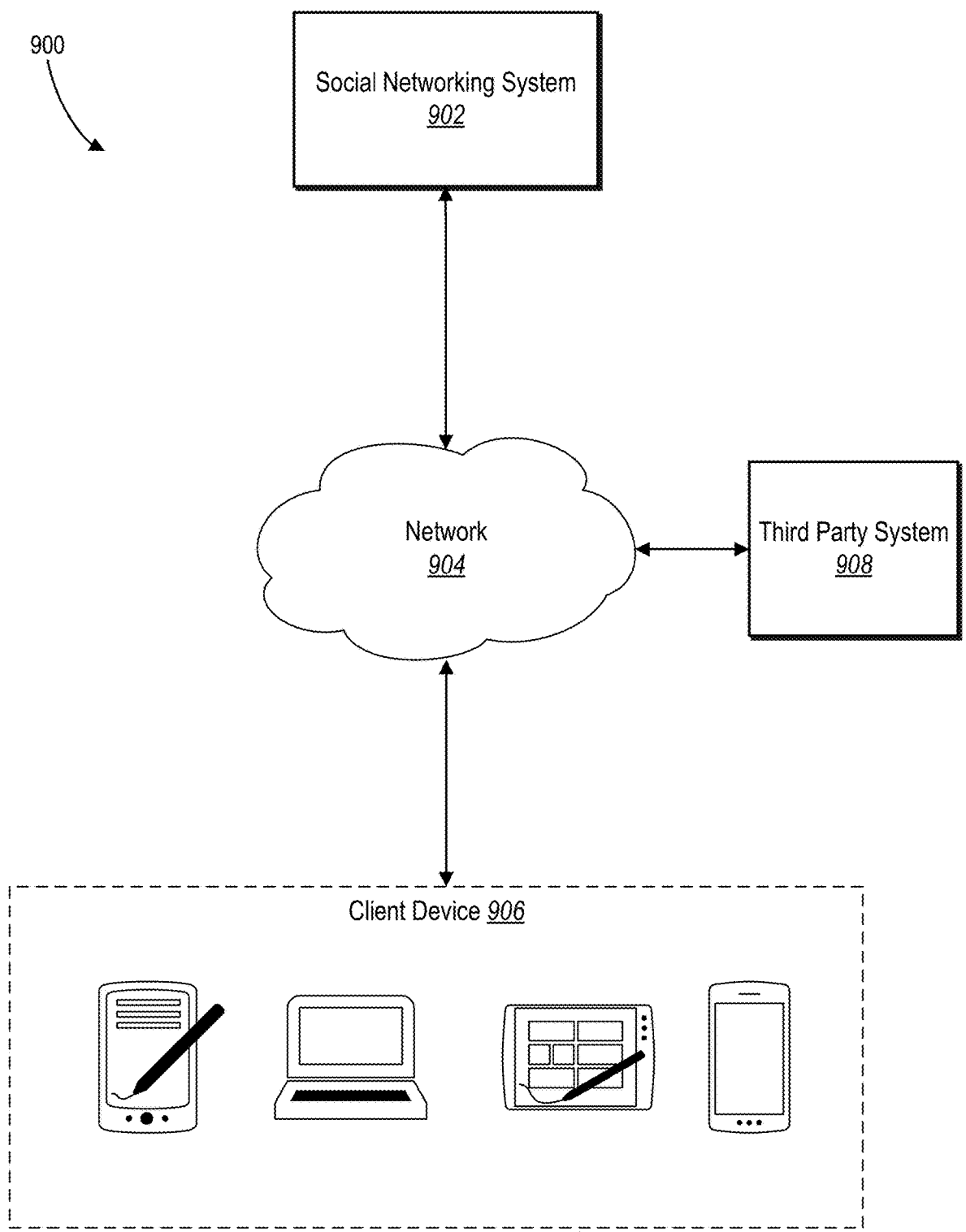
FIG. 9 illustrates a network environment of a social networking system according one or more embodiments.

FIG. 9 illustrates an example network environment of a social networking system. In particular embodiments, a social networking system 902 may comprise one or more data stores. In particular embodiments, the social networking system 902 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social networking system 902 may comprise one or more computing devices (e.g., servers) hosting functionality directed to operation of the social networking system 902. A user of the social networking system 902 may access the social networking system 902 using a client device such as client device 906. In particular embodiments, the client device 906 can interact with the social networking system 902 through a network 904.

The client device 906 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 906 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 904.

Network 904 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 906 may access the social networking system 902.

While these methods, systems, and user interfaces utilize both publicly available information as well as information provided by users of the social networking system, all use of such information is to be explicitly subject to all privacy settings of the involved users and the privacy policy of the social networking system as a whole.

Figure 10:
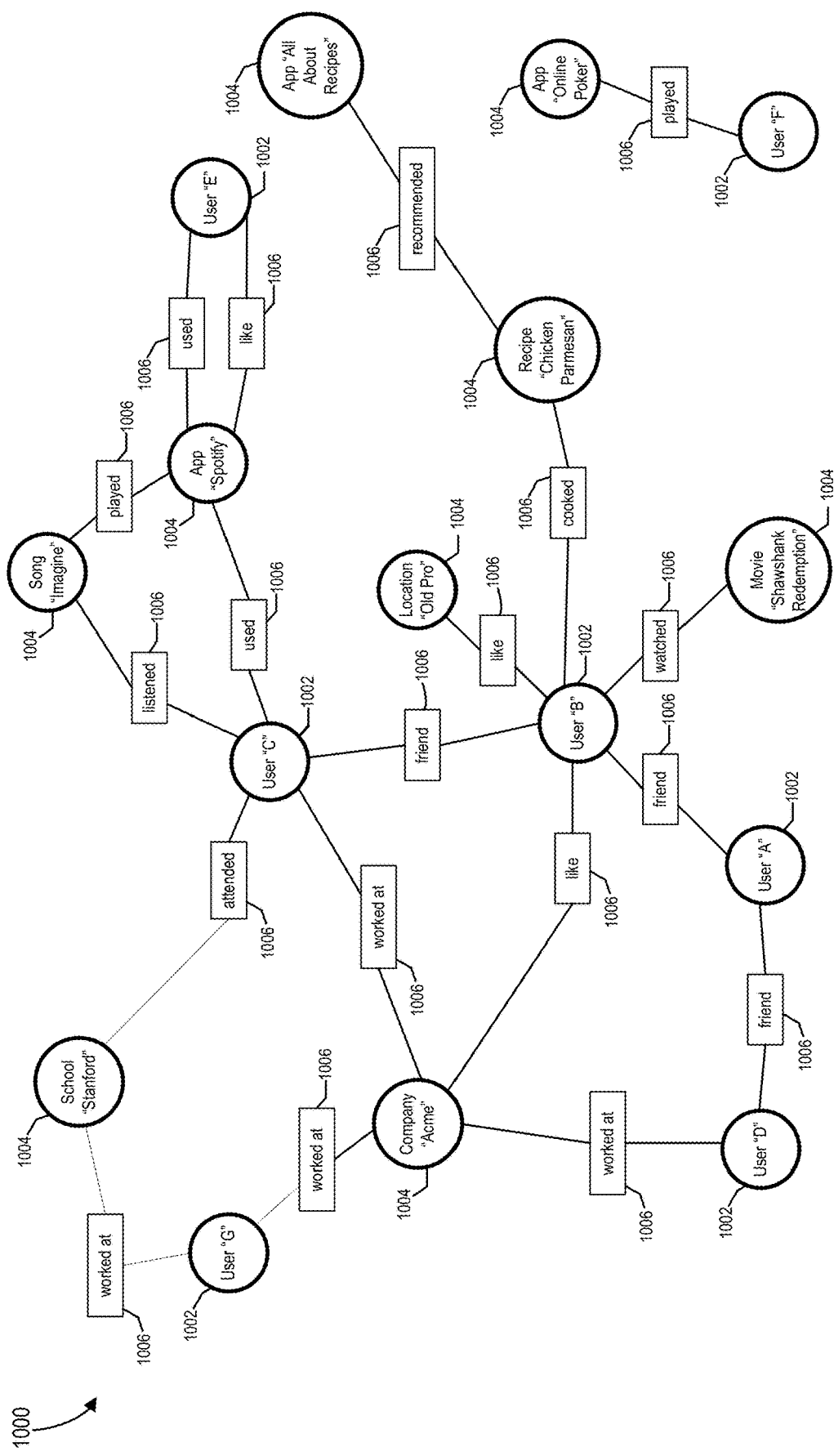
FIG. 10 illustrates an example social graph of a social networking system in accordance with one or more embodiments.

FIG. 10 illustrates example social graph 1000. In particular embodiments, social networking system 902 may store one or more social graphs 1000 in one or more data stores. In particular embodiments, social graph 1000 may include multiple nodes—which may include multiple user nodes 1002 or multiple concept nodes 1004—and multiple edges 1006 connecting the nodes. Example social graph 1000 illustrated in FIG. 10 is shown, for didactic purposes, in a two-dimensional visual map representation. In particular embodiments, a social networking system 902, client device 906, or third-party system 908 may access social graph 1000 and related social-graph information for suitable applications. The nodes and edges of social graph 1000 may be stored as data objects, for example, in a data store (such as a social-graph database). Such a data store may include one or more searchable or query able indexes of nodes or edges of social graph 1000.

In particular embodiments, a user node 1002 may correspond to a user of social networking system 902. As an example and not by way of limitation, a user may be an individual (human user), an entity (e.g., an enterprise, business, or third-party application), or a group (e.g., of individuals or entities) that interacts or communicates with or over social networking system 902. In particular embodiments, when a user registers for an account with social networking system 902, social networking system 902 may create a user node 1002 corresponding to the user, and store the user node 1002 in one or more data stores. Users and user nodes 1002 described herein may, where appropriate, refer to registered users and user nodes 1002 associated with registered users. In addition or as an alternative, users and user nodes 1002 described herein may, where appropriate, refer to users that have not registered with social networking system 902. In particular embodiments, a user node 1002 may be associated with information provided by a user or information gathered by various systems, including social networking system 902. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 1004 may correspond to a concept. As an example and not by way of limitation, a concept may correspond to a place (such as, for example, a movie theater, restaurant, landmark, or city); a website (such as, for example, a website associated with social network system 902 or a third-party website associated with a web-application server); an entity (such as, for example, a person, business, group, sports team, or celebrity); a resource (such as, for example, an audio file, video file, digital photo, text file, structured document, or application) which may be located within social networking system 902 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1004 may be associated with information of a concept provided by a user or information gathered by various systems, including social networking system 902. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1004 may be associated with one or more data objects corresponding to information associated with concept node 1004. In particular embodiments, a concept node 1004 may correspond to one or more webpages.

In particular embodiments, a node in social graph 1000 may represent or be represented by a webpage (which may be referred to as a "profile page"). Profile pages may be hosted by or accessible to social networking system 902. Profile pages may also be hosted on third-party websites associated with a third-party server 908. As an example and not by way of limitation, a profile page corresponding to a particular external webpage may be the particular external webpage and the profile page may correspond to a particular concept node 1004. Profile pages may be viewable by all or a selected subset of other users. As an example and not by way of limitation, a user node 1002 may have a corresponding user-profile page in which the corresponding user may add content, make declarations, or otherwise express himself or herself. As another example and not by way of limitation, a concept node 1004 may have a corresponding concept-profile page in which one or more users may add content, make declarations, or express themselves, particularly in relation to the concept corresponding to concept node 1004.

In particular embodiments, a concept node 1004 may represent a third-party webpage or resource hosted by a third-party system 908. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 906 to send to social networking system 902 a message indicating the user's action. In response to the message, social networking system 902 may create an edge (e.g., an "eat" edge) between a user node 1002 corresponding to the user and a concept node 1004 corresponding to the third-party webpage or resource and store edge 1006 in one or more data stores.

In particular embodiments, a pair of nodes in social graph 1000 may be connected to each other by one or more edges 1006. An edge 1006 connecting a pair of nodes may represent a relationship between the pair of nodes. In particular embodiments, an edge 1006 may include or represent one or more data objects or attributes corresponding to the relationship between a pair of nodes. As an example and not by way of limitation, a first user may indicate that a second user is a "friend" of the first user. In response to this indication, social networking system 902 may send a "friend request" to the second user. If the second user confirms the "friend request," social networking system 902 may create an edge 1006 connecting the first user's user node 1002 to the second user's user node 1002 in social graph 1000 and store edge 1006 as social-graph information in one or more of data stores. In the example of FIG. 10, social graph 1000 includes an edge 1006 indicating a friend relation between user nodes 1002 of user "A" and user "B" and an edge indicating a friend relation between user nodes 1002 of user "C" and user "B." Although this disclosure describes or illustrates particular edges 1006 with particular attributes connecting particular user nodes 1002, this disclosure contemplates any suitable edges 1006 with any suitable attributes connecting user nodes 1002. As an example and not by way of limitation, an edge 1006 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1000 by one or more edges 1006.

In particular embodiments, an edge 1006 between a user node 1002 and a concept node 1004 may represent a particular action or activity performed by a user associated with user node 1002 toward a concept associated with a concept node 1004. As an example and not by way of limitation, as illustrated in FIG. 10, a user may "like," "attended," "played," "listened," "cooked," "worked at," or "watched" a concept, each of which may correspond to a edge type or subtype. A concept-profile page corresponding to a concept node 1004 may include, for example, a selectable "check in" icon (such as, for example, a clickable "check in" icon) or a selectable "add to favorites" icon. Similarly, after a user clicks these icons, social networking system 902 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social networking system 902 may create a "listened" edge 1006 and a "used" edge (as illustrated in FIG. 10) between user nodes 1002 corresponding to the user and concept nodes 1004 corresponding to the song and application to indicate that the user listened to the song and used the application. Moreover, social networking system 902 may create a "played" edge 1006 (as illustrated in FIG. 10) between concept nodes 1004 corresponding to the song and the application to indicate that the particular song was played by the particular application. In this case, "played" edge 1006 corresponds to an action performed by an external application (SPOTIFY) on an external audio file (the song "Imagine"). Although this disclosure describes particular edges 1006 with particular attributes connecting user nodes 1002 and concept nodes 1004, this disclosure contemplates any suitable edges 1006 with any suitable attributes connecting user nodes 1002 and concept nodes 1004. Moreover, although this disclosure describes edges between a user node 1002 and a concept node 1004 representing a single relationship, this disclosure contemplates edges between a user node 1002 and a concept node 1004 representing one or more relationships. As an example and not by way of limitation, an edge 1006 may represent both that a user likes and has used at a particular concept. Alternatively, another edge 1006 may represent each type of relationship (or multiples of a single relationship) between a user node 1002 and a concept node 1004 (as illustrated in FIG. 10 between user node 1002 for user "E" and concept node 1004 for "SPOTIFY").

In particular embodiments, social networking system 902 may create an edge 1006 between a user node 1002 and a concept node 1004 in social graph 1000. As an example and not by way of limitation, a user viewing a concept-profile page (such as, for example, by using a web browser or a special-purpose application hosted by the user's client system 906) may indicate that he or she likes the concept represented by the concept node 1004 by clicking or selecting a "Like" icon, which may cause the user's client system 906 to send to social networking system 902 a message indicating the user's liking of the concept associated with the concept-profile page. In response to the message, social networking system 902 may create an edge 1006 between user node 1002 associated with the user and concept node 1004, as illustrated by "like" edge 1006 between the user and concept node 1004. In particular embodiments, social networking system 902 may store an edge 1006 in one or more data stores. In particular embodiments, an edge 1006 may be automatically formed by social networking system 902 in response to a particular user action. As an example and not by way of limitation, if a first user uploads a picture, watches a movie, or listens to a song, an edge 1006 may be formed between user node 1002 corresponding to the first user and concept nodes 1004 corresponding to those concepts. Although this disclosure describes forming particular edges 1006 in particular manners, this disclosure contemplates forming any suitable edges 1006 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social networking system 902). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social networking system 902 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social networking system 902) or RSVP (e.g., through social networking system 902) to an event associated with the advertisement. In addition or as an alternative, an advertisement may include social-networking-system context directed to the user. As an example and not by way of limitation, an advertisement may display information about a friend of the user within social networking system 902 who has taken an action associated with the subject matter of the advertisement.

In particular embodiments, social networking system 902 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 908 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social networking system 902 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social networking system 902 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 250%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social networking system 902 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social networking system 902 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social networking system 902 may calculate a coefficient based on a user's actions. Social networking system 902 may monitor such actions on the online social network, on a third-party system 908, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social networking system 902 may calculate a coefficient based on the user's actions with particular types of content. The content may be associated with the online social network, a third-party system 908, or another suitable system. The content may include users, profile pages, posts, news stories, headlines, instant messages, chat room conversations, emails, advertisements, pictures, video, music, other suitable objects, or any combination thereof. Social networking system 902 may analyze a user's actions to determine whether one or more of the actions indicate an affinity for subject matter, content, other users, and so forth. As an example and not by way of limitation, if a user may make frequently posts content related to "coffee" or variants thereof, social networking system 902 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social networking system 902 may calculate a coefficient based on the type of relationship between particular objects. Referencing the social graph 1000, social networking system 902 may analyze the number and/or type of edges 1006 connecting particular user nodes 1002 and concept nodes 1004 when calculating a coefficient. As an example and not by way of limitation, user nodes 1002 that are connected by a spouse-type edge (representing that the two users are married) may be assigned a higher coefficient than a user nodes 1002 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social networking system 902 may determine that the user has a higher coefficient with respect to the first photo than the second photo because having a tagged-in-type relationship with content may be assigned a higher weight and/or rating than having a like-type relationship with content. In particular embodiments, social networking system 902 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social networking system 902 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 1000. As an example and not by way of limitation, social-graph entities that are closer in the social graph 1000 (i.e., fewer degrees of separation) may have a higher coefficient than entities that are further apart in the social graph 1000.

In particular embodiments, social networking system 902 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client system 906 of the user). A first user may be more interested in other users or concepts that are closer to the first user. As an example and not by way of limitation, if a user is one mile from an airport and two miles from a gas station, social networking system 902 may determine that the user has a higher coefficient for the airport than the gas station based on the proximity of the airport to the user.

In particular embodiments, social networking system 902 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social networking system 902 may provide information that is relevant to user's interests and current circumstances, increasing the likelihood that they will find such information of interest. In particular embodiments, social networking system 902 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social networking system 902 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social networking system 902 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 908 (e.g., via an API or other communication channel), or from another suitable system. In response to the request, social networking system 902 may calculate the coefficient (or access the coefficient information if it has previously been calculated and stored). In particular embodiments, social networking system 902 may measure an affinity with respect to a particular process. Different processes (both internal and external to the online social network) may request a coefficient for a particular object or set of objects. Social networking system 902 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed Aug. 8, 2006, U.S. patent application Ser. No. 12/977,027, filed Dec. 22, 2010, U.S. patent application Ser. No. 12/978,265, filed Dec. 23, 2010, and U.S. patent application Ser. No. 13/632,869, field Oct. 1, 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by social networking system 902 or shared with other systems (e.g., third-party system 908). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 908, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social networking system 902 may send a request to the data store for the object. The request may identify the user associated with the request and may only be sent to the user (or a client system 906 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating a digital visual code encoding an identifier associated with a feature of a software application;
receiving, from a computing device associated with the software application, the identifier, wherein the identifier is obtained by the computing device by scanning the digital visual code; and
in response to receiving the identifier from the computing device, unlocking the feature of the software application for the computing device.

2. The computer-implemented method of claim 1, further comprising de-activating the digital visual code after a threshold period of time or a threshold number of scans of the digital visual code.

3. The computer-implemented method of claim 2, further comprising de-activating the feature of the software application by modifying a digital visual code database to disassociate the digital visual code from the computing device.

4. The computer-implemented method of claim 2, further comprising:
based on determining that the digital visual code is de-activated, rejecting a request to utilize the feature of the software application.

5. The computer-implemented method of claim 1, wherein unlocking the feature of the software application for the computing device comprises providing access to a digital media item.

6. The computer-implemented method of claim 5, wherein the digital media item is an overlay for a digital image.

7. The computer-implemented method of claim 1, wherein unlocking the feature of the software application for the computing device comprises providing access to an account of another user of the software application.

8. The computer-implemented method of claim 1, wherein generating the digital visual code encoding the identifier associated with the feature of the software application comprises positioning digital visual code points about a digital media item associated with the feature of the software application.

9. The computer-implemented method of claim 1, wherein unlocking the feature of the software application for the computing device comprises providing the computing device an ability to use a capability of the software application.

10. A system comprising:
one or more memory devices; and
one or more processors coupled to the one or more memory devices, the one or more processors being configured to cause the system to:
generate a digital visual code encoding an identifier associated with a feature of a software application;
receive, from a computing device associated with the software application, the identifier, wherein the identifier is obtained by the computing device by scanning the digital visual code; and
in response to receiving the identifier from the computing device, unlock the feature of the software application for the computing device.

11. The system of claim 10, wherein the one or more processors are further configured to cause the system to unlock the feature of the software application for the computing device by providing access to a digital media item.

12. The system of claim 11, wherein the digital media item is an overlay for a digital image.

13. The system of claim 10, wherein the one or more processors are further configured to cause the system to unlock the feature of the software application for the computing device by providing access to an account of another user of the software application.

14. The system of claim 10, wherein the one or more processors are further configured to cause the system to generate the digital visual code encoding the identifier associated with the feature of the software application by positioning digital visual code points about a digital media item associated with the feature of the software application.

15. The system of claim 10, wherein the one or more processors are further configured to cause the system to unlock the feature of the software application for the computing device by providing the computing device an ability to use a capability of the software application.

16. A non-transitory computer readable medium storing instructions thereon that, when executed by at least one processor, cause the at least one processor to perform operations comprising:
 generating a digital visual code encoding an identifier associated with a feature of a software application;
 receiving, from a computing device associated with the software application, the identifier, wherein the identifier is obtained by the computing device by scanning the digital visual code; and
 in response to receiving the identifier from the computing device, unlocking the feature of the software application for the computing device.

17. The non-transitory computer readable medium of claim 16, wherein unlocking the feature of the software application for the computing device comprises unlocking the feature of the software application for a user account of the software application associated with the computing device.

18. The non-transitory computer readable medium of claim 16, wherein unlocking the feature of the software application comprise providing access to a digital media item to the computing device.

19. The non-transitory computer readable medium of claim 18, wherein the digital media item is an overlay for a digital image.

20. The non-transitory computer readable medium of claim 16, wherein generating the digital visual code encoding the identifier associated with the feature of the software application comprises positioning digital visual code points about a digital media item associated with the feature of the software application.

* * * * *